United States Patent
Hatanaka et al.

(10) Patent No.: US 12,008,989 B2
(45) Date of Patent: Jun. 11, 2024

(54) ELECTRONIC APPARATUS AND PROCESSING SYSTEM

(71) Applicant: KYOCERA Corporation, Kyoto (JP)

(72) Inventors: Akihito Hatanaka, Yokohama (JP); Tomoki Iwaizumi, Osaka (JP); Youji Hamada, Kyoto (JP); Hisae Honma, Yokohama (JP); Kousuke Nagase, Yokohama (JP); Tomohiro Sudou, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 797 days.

(21) Appl. No.: 17/072,415

(22) Filed: Oct. 16, 2020

(65) Prior Publication Data
US 2021/0035581 A1 Feb. 4, 2021

Related U.S. Application Data

(63) Continuation of application No. PCT/JP2019/002201, filed on Jan. 24, 2019.

(30) Foreign Application Priority Data

Apr. 25, 2018 (JP) ................................. 2018-084492

(51) Int. Cl.
*G10L 15/22* (2006.01)
*G10L 15/26* (2006.01)
*H04M 3/533* (2006.01)

(52) U.S. Cl.
CPC ............. *G10L 15/22* (2013.01); *H04M 3/533* (2013.01)

(58) Field of Classification Search
CPC ....... G10L 13/033; G10L 15/26; G10L 15/22; H04M 3/42348; H04M 3/42365; H04M 3/42382; H04M 3/533
(Continued)

(56) References Cited

U.S. PATENT DOCUMENTS 5,724,410 A * 3/1998 Parvulescu ......... H04M 1/7243
704/258
7,359,714 B2 * 4/2008 Parupudi ........... H04M 1/72448
455/418
(Continued)

FOREIGN PATENT DOCUMENTS

JP 2008-109595 A 5/2008
JP 2008-252196 A 10/2008
(Continued)

*Primary Examiner* — Martin Lerner
(74) *Attorney, Agent, or Firm* — Studebaker & Brackett PC

(57) ABSTRACT

An electronic apparatus and a processing system are disclosed. In one embodiment, an electronic apparatus comprises a communication unit and at least one processor. The communication unit is configured to acquire information related to an other-party apparatus. The at least one processor is configured to receive input of a voice signal output from a first voice input unit. The electronic apparatus and the other-party apparatus are capable of communicating with each other with voice/message converted communication in which first voice input to the first voice input unit is converted into a first message and the first message is displayed on the other-party apparatus. The at least one processor determines execution of the voice/message converted communication, based on the information.

13 Claims, 30 Drawing Sheets

(58) Field of Classification Search
USPC .............. 704/235, 251, 260, 269; 379/88.14, 379/88.16, 88.01
See application file for complete search history.

(56) References Cited

U.S. PATENT DOCUMENTS

| | | | | |
|---|---|---|---|---|
| 7,369,649 | B2* | 5/2008 | Zhong | H04M 3/533 379/88.14 |
| 8,130,917 | B2* | 3/2012 | Helbling | H04L 12/18 379/88.13 |
| 10,033,864 | B2* | 7/2018 | Patel | H04M 7/0045 |
| 10,470,005 | B1* | 11/2019 | Rathnam | G10L 15/26 |
| 11,037,568 | B2* | 6/2021 | Zhang | H04W 4/18 |
| 2003/0135569 | A1* | 7/2003 | Khakoo | G10L 13/00 704/270 |
| 2006/0217159 | A1* | 9/2006 | Watson | H04M 1/72403 455/563 |
| 2007/0190944 | A1* | 8/2007 | Doan | H04M 1/72454 455/63.1 |
| 2007/0260456 | A1* | 11/2007 | Proux | G10L 15/26 704/235 |
| 2010/0217600 | A1* | 8/2010 | Lobzakov | G10L 13/00 704/260 |
| 2010/0250249 | A1* | 9/2010 | Fujino | H04N 7/147 704/235 |
| 2011/0144989 | A1* | 6/2011 | Dowlatkhah | G10L 15/26 704/235 |
| 2011/0179180 | A1 | 7/2011 | Schleifer et al. | |
| 2011/0300833 | A1* | 12/2011 | Shaw | H04M 3/53333 704/235 |
| 2015/0340037 | A1 | 11/2015 | Kim et al. | |
| 2018/0034961 | A1* | 2/2018 | Engelke | G10L 15/22 |
| 2018/0091643 | A1* | 3/2018 | Singh | G10L 15/26 |

FOREIGN PATENT DOCUMENTS

| | | |
|---|---|---|
| JP | 2013-517739 A | 5/2013 |
| JP | 2017-517228 A | 6/2017 |
| KR | 10-2010-0133128 A | 12/2010 |

\* cited by examiner

F I G. 5
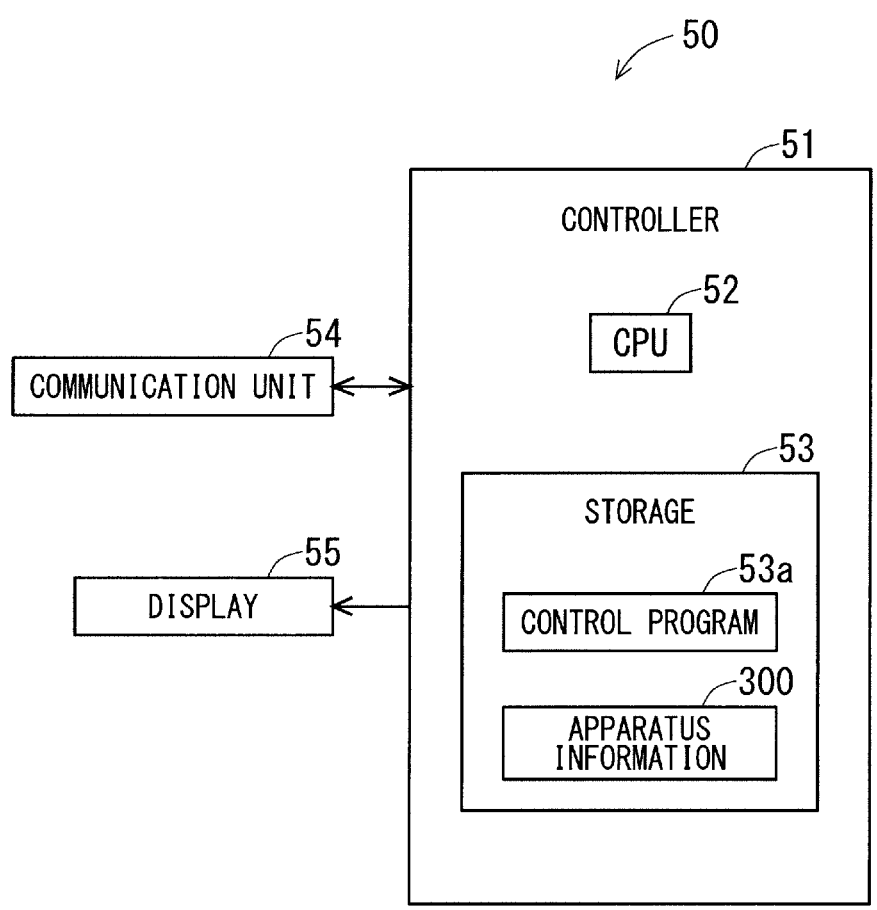

F I G. 7
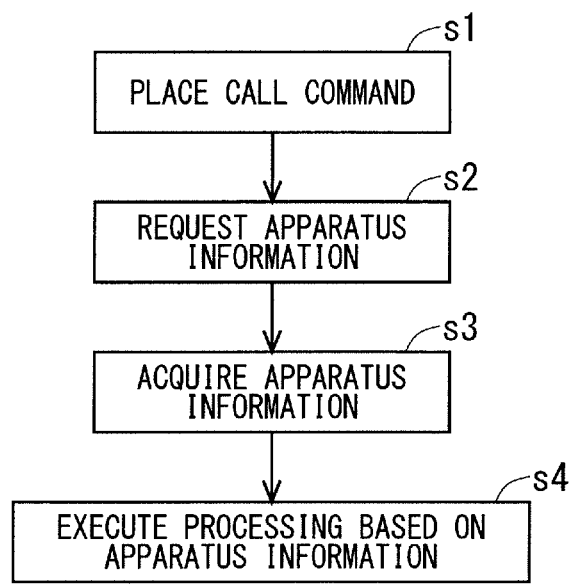

F I G. 1 2
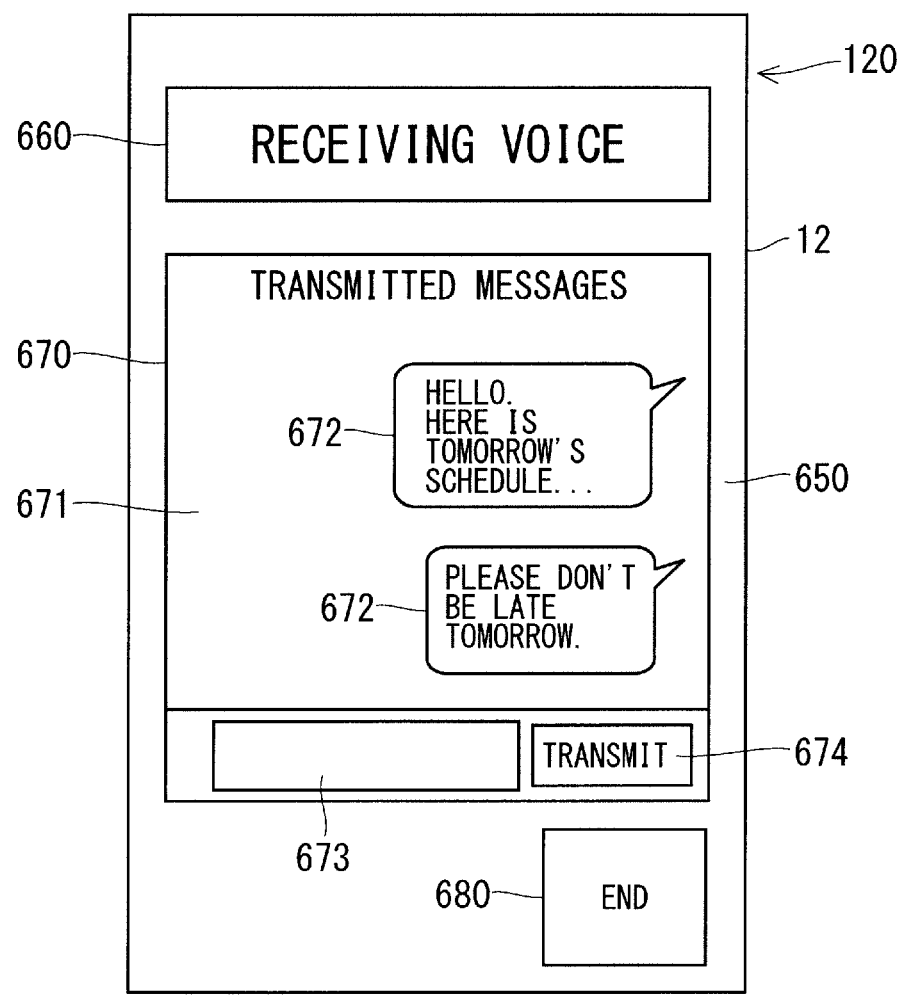

F I G. 1 4
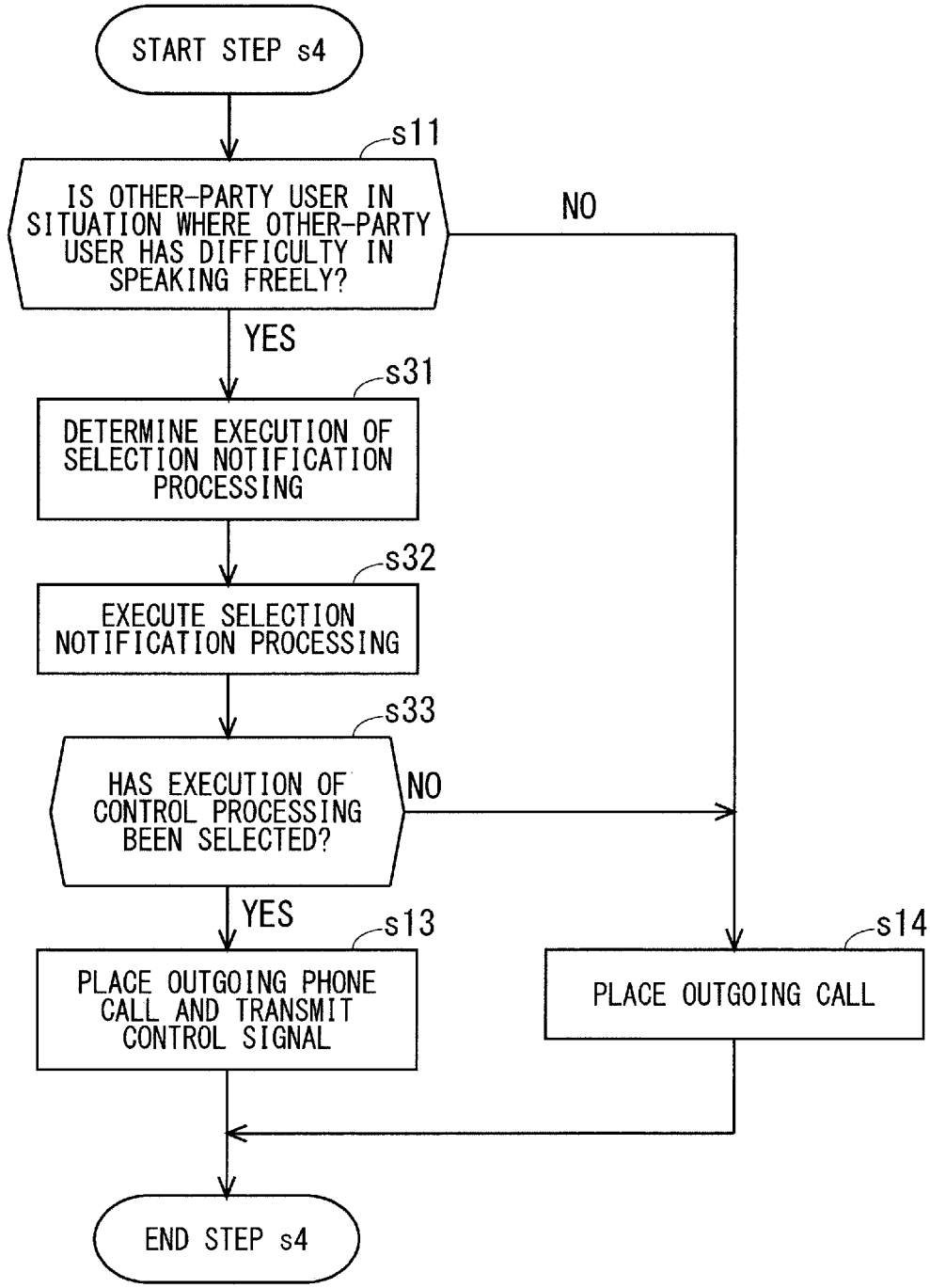

F I G. 3 0
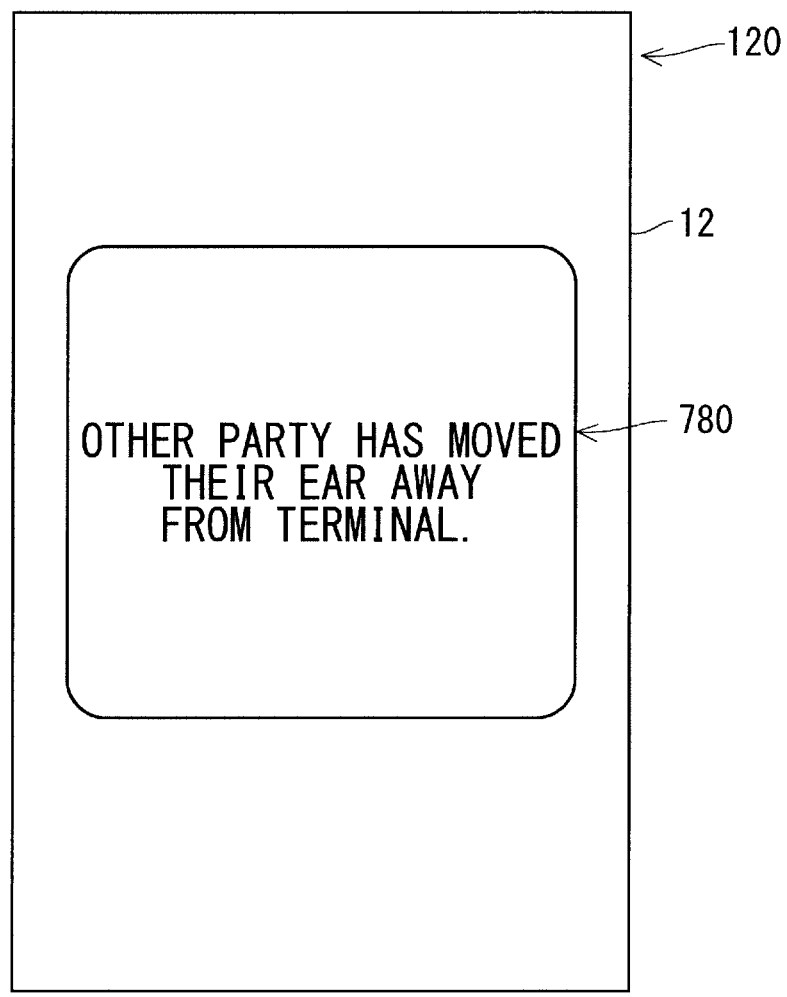

ELECTRONIC APPARATUS AND PROCESSING SYSTEM

CROSS-REFERENCE TO RELATED APPLICATION

The present application is a continuation based on PCT Application No. PCT/JP2019/002201 filed on Jan. 24, 2019, which claims the benefit of Japanese Application No. 2018-084492, filed on Apr. 25, 2018. PCT Application No. PCT/JP2019/002201 is entitled "ELECTRONIC DEVICE AND PROCESSING SYSTEM", and Japanese Application No. 2018-084492 is entitled "ELECTRONIC APPARATUS AND PROCESSING SYSTEM". The content of which are incorporated by reference herein in their entirety.

FIELD

Embodiments of the present disclosure relate generally to an electronic apparatus.

BACKGROUND

Various technologies have been proposed regarding an electronic apparatus.

SUMMARY

An electronic apparatus and a processing system are disclosed. In a first embodiment, an electronic apparatus comprises a communication unit and at least one processor. The communication unit is configured to acquire information related to an other-party apparatus. The at least one processor is configured to receive input of a voice signal output from a first voice input unit. The electronic apparatus and the other-party apparatus are capable of communicating with each other with voice/message converted communication in which first voice input to the first voice input unit is converted into a first message and the first message is displayed on the other-party apparatus. The at least one processor determines execution of the voice/message converted communication, based on the information.

In a second embodiment, an electronic apparatus comprises a communication unit and at least one processor. The communication unit is configured to acquire information related to an other-party apparatus. The at least one processor is configured to receive input of a voice signal output from a first voice input unit. The other-party apparatus performs processing using a voice signal output by a second voice input unit. The other-party apparatus causes a sound output unit to output voice. The at least one processor is capable of executing control processing of controlling the other-party apparatus so that the other-party apparatus executes an application for message communication without transmitting second voice input to the second sound voice input unit to the electronic apparatus when the other-party apparatus causes the sound output unit to output first voice being transmitted by the communication unit and input to the first voice input unit. The at least one processor determines execution of the control processing, based on the information.

In a third embodiment, an electronic apparatus comprises a communication unit, a notification unit, and at least one processor. The communication unit is configured to acquire information related to an other-party apparatus. The notification unit is configured to give a notification to a user. The at least one processor is configured to receive input of a voice signal output from a first voice input unit. The other-party apparatus performs processing using a voice signal output by a second voice input unit. The other-party apparatus causes a sound output unit to output voice. The at least one processor is capable of executing control processing of controlling the other-party apparatus so that the other-party apparatus executes an application for message communication without transmitting second voice input to the second voice input unit to the electronic apparatus when the other-party apparatus causes the sound output unit to output first voice being transmitted by the communication unit and input to the first voice input unit. The at least one processor determines execution of processing of causing the notification unit to give a notification suggesting that the user make a selection as to whether or not the electronic apparatus performs the control processing, based on the information.

In a fourth embodiment, an electronic apparatus is the other-party apparatus with which the electronic apparatus according to the first embodiment is capable of communicating.

In a fifth embodiment, an electronic apparatus is the other-party apparatus with which the electronic apparatus according to the second embodiment is capable of communicating.

In a sixth embodiment, an electronic apparatus is the other-party apparatus with which the electronic apparatus according to the third embodiment is capable of communicating.

In a seventh embodiment, a processing system comprises the electronic apparatus according to the first embodiment, and the other-party apparatus with which the electronic apparatus is capable of communicating.

In an eighth embodiment, a processing system comprises the electronic apparatus according to the second embodiment, and the other-party apparatus with which the electronic apparatus is capable of communicating.

In a ninth embodiment, a processing system comprises the electronic apparatus according to the third embodiment, and the other-party apparatus with which the electronic apparatus is capable of communicating.

BRIEF DESCRIPTION OF THE DRAWINGS

FIG. 5 is a block diagram illustrating one example of a configuration of a server apparatus.

FIG. 7 is a flowchart illustrating one example of operation of the electronic apparatus.

FIG. 12 is a diagram illustrating one example of display of the electronic apparatus.

FIG. 14 is a flowchart illustrating one example of operation of the electronic apparatus.

FIG. 30 is a diagram illustrating one example of display of the electronic apparatus.

DETAILED DESCRIPTION

<Overview of One Example of Processing System>

Figure 1:
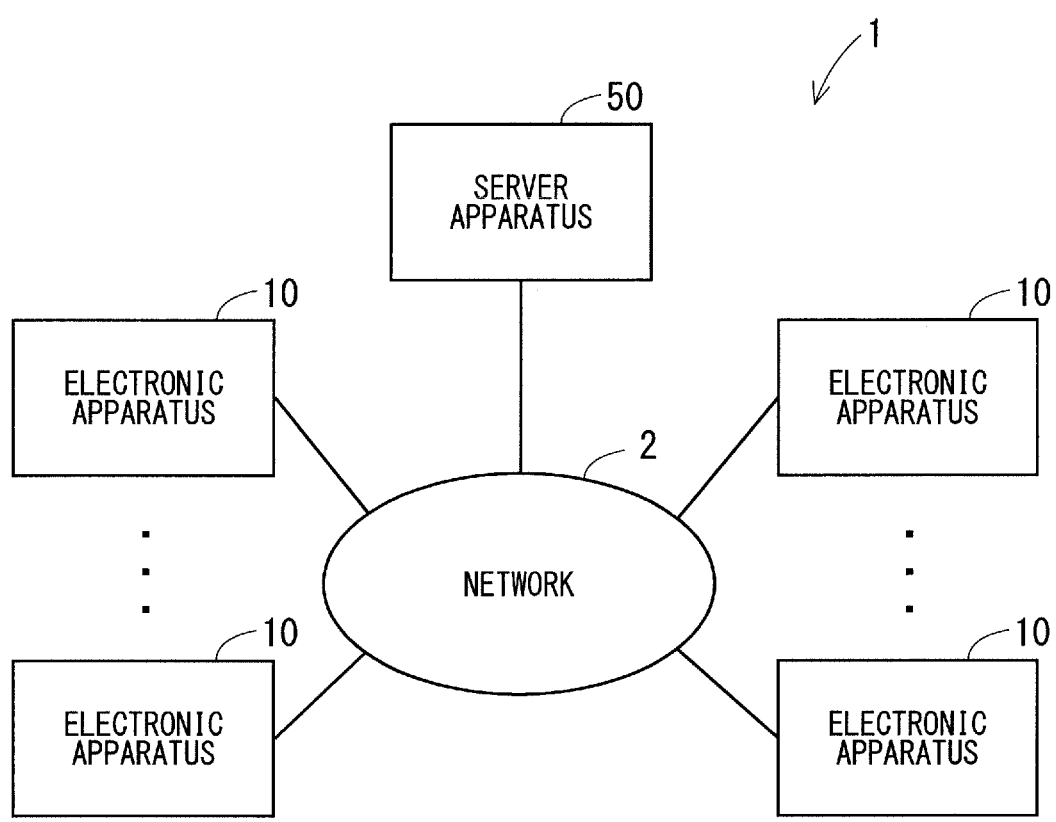
FIG. 1 is a diagram illustrating one example of a processing system.

FIG. 1 is a diagram illustrating one example of a configuration of a processing system 1. As illustrated in FIG. 1, the processing system 1 comprises a plurality of electronic apparatuses 10 and a server apparatus 50 that are each connected to a network 2. Each of the plurality of electronic apparatuses 10 and the server apparatus 50 can communicate with each other via the network 2.

The network 2 includes at least one of a wireless network and a wired network. In one example, the network 2 includes, for example, a network of a mobile phone system including a base station etc., a wireless local area network (LAN), the Internet, etc.

Each electronic apparatus 10 can transmit information related to the electronic apparatus 10 itself to the server apparatus 50. The information related to the electronic apparatus 10 may be hereinafter referred to as "apparatus information". Further, in the description of operation of the electronic apparatus 10, the term "subject apparatus" refers to the electronic apparatus 10 itself, and the term "subject apparatus user" refers to a user of the electronic apparatus 10. Further, in the description of operation of the electronic apparatus 10, the term "user" by itself refers to a user of the electronic apparatus 10. Further, in the description of operation of the electronic apparatus 10, another electronic apparatus 10 as an apparatus of the other party with which the electronic apparatus 10 communicates may be referred to as an "other-party apparatus 10". Further, a user of the other-party apparatus 10 may be referred to as an "other-party user". Further, an electronic apparatus 10 being described may be referred to as a "target electronic apparatus 10".

The plurality of electronic apparatuses 10 connected to the network 2 include, for example, a mobile phone device such as a smartphone, a tablet terminal, a personal computer, a wearable apparatus, etc. The wearable apparatus included in the plurality of electronic apparatuses 10 may be a type worn on the arm such as a wristband type or a wristwatch type, may be a type worn on the head such as a headband type or an eyeglass type, or may be a type worn on the body such as a garment type. The wristwatch-type wearable apparatus may be referred to as a smartwatch.

The server apparatus 50 is a type of computer apparatus. The server apparatus 50 can store apparatus information transmitted from each electronic apparatus 10. The server apparatus 50 can transmit apparatus information of another electronic apparatus 10 to the electronic apparatus 10, in response to a request made by the electronic apparatus 10. The electronic apparatus 10 can receive the apparatus information of the another electronic apparatus 10 from the server apparatus 50, and can perform processing based on the received apparatus information.

The following is a detailed description of the processing system 1. The following provides a description of the processing system 1 by principally taking an example of a case in which the electronic apparatus 10 is a mobile phone device.

<Configuration Example of Electronic Apparatus>
<One Example of External Appearance of Electronic Apparatus>

Figure 2:
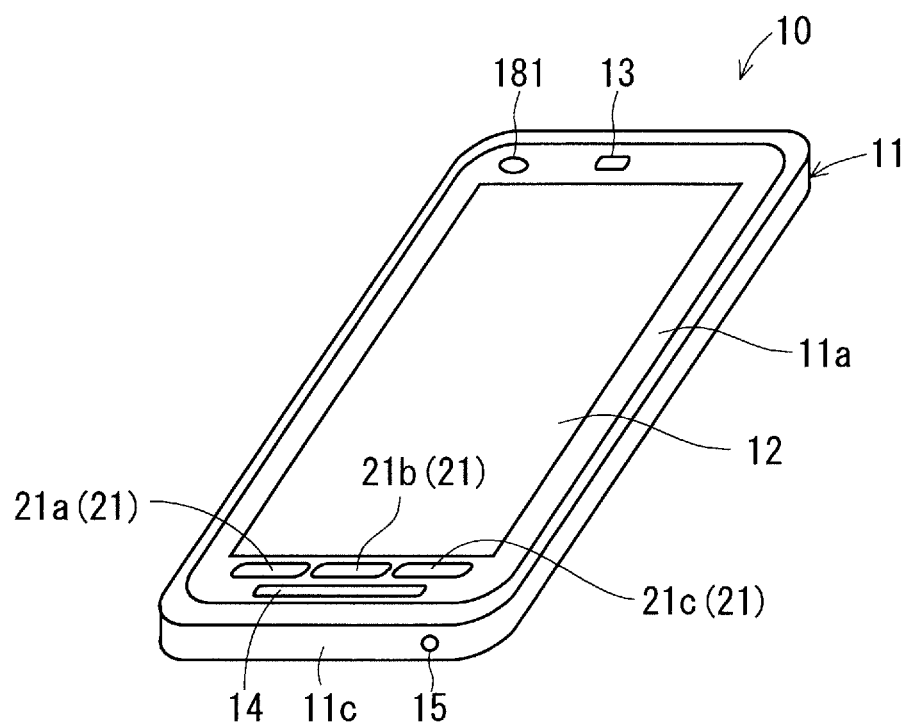
FIG. 2 is a perspective view illustrating one example of external appearance of an electronic apparatus.
Figure 3:
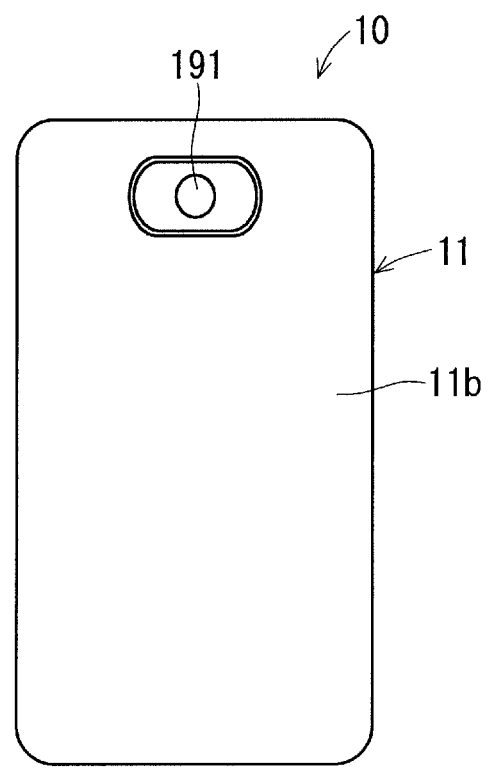
FIG. 3 is a back view illustrating one example of external appearance of the electronic apparatus.

FIGS. 2 and 3 are respectively a perspective view and a back view each illustrating one example of external appearance of the electronic apparatus 10 being a mobile phone device. As illustrated in FIGS. 2 and 3, the electronic apparatus 10 comprises a plate-like apparatus case 11 having substantially a rectangle shape in plan view. The apparatus case 11 constitutes the exterior of the electronic apparatus 10.

A display surface 12 is located on a front surface 11a of the apparatus case 11. On the display surface 12, various pieces of information such as letters, symbols, and graphics are displayed. A touch panel 130 to be described later is located on the back surface side of the display surface 12. With this configuration, the user can input various pieces of information to the electronic apparatus 10 by operating the display surface 12 on the front surface of the electronic apparatus 10 with their finger or the like. Note that the user can also input various pieces of information to the electronic apparatus 10 by operating the display surface 12 with a pointer other than their finger, for example, with a touch panel pen such as a stylus pen.

A receiver hole 13 is located at an upper end portion of the front surface 11a of the apparatus case 11. A speaker hole 14 is located at a lower end portion of the front surface 11a. A microphone hole 15 is located on a side surface 11c that is located on the lower side of the apparatus case 11.

A lens 181 of a first camera 180 to be described later is visually recognizable at the upper end portion of the front surface 11a of the apparatus case 11. As illustrated in FIG. 3, a lens 191 of a second camera 190 to be described later is visually recognizable at the upper end portion of a back surface 11b of the apparatus case 11.

The electronic apparatus 10 comprises an operation button group 210 consisting of a plurality of operation buttons 21 (see FIG. 4 to be described later). Each of the plurality of operation buttons 21 is a hardware button. Specifically, each of the plurality of operation buttons 21 is a push button. Note that at least one of the operation buttons 21 included in the operation button group 210 may be a software button displayed on the display surface 12.

The operation button group 210 comprises operation buttons 21a, 21b, 21c located at the lower end portion of the front surface 11a of the apparatus case 11. The operation button group 210 may comprise a power button and a volume button.

The operation button 21a is, for example, a back button. The back button is an operation button for switching the display of the display surface 12 to its immediately preceding display. When the user operates the operation button 21a, the display of the display surface 12 is switched to its immediately preceding display. The operation button 21b is, for example, a home button. The home button is an operation button for displaying a home screen on the display surface 12. When the user operates the operation button 21b, the home screen is displayed on the display surface 12. The operation button 21c is, for example, a history button. The history button is an operation button for displaying a history of applications executed in the electronic apparatus 10 on the display surface 12. When the user operates the operation button 21c, a history of applications executed in the electronic apparatus 10 is displayed on the display surface 12.

<One Example of Electrical Configuration of Electronic Apparatus>

Figure 4:
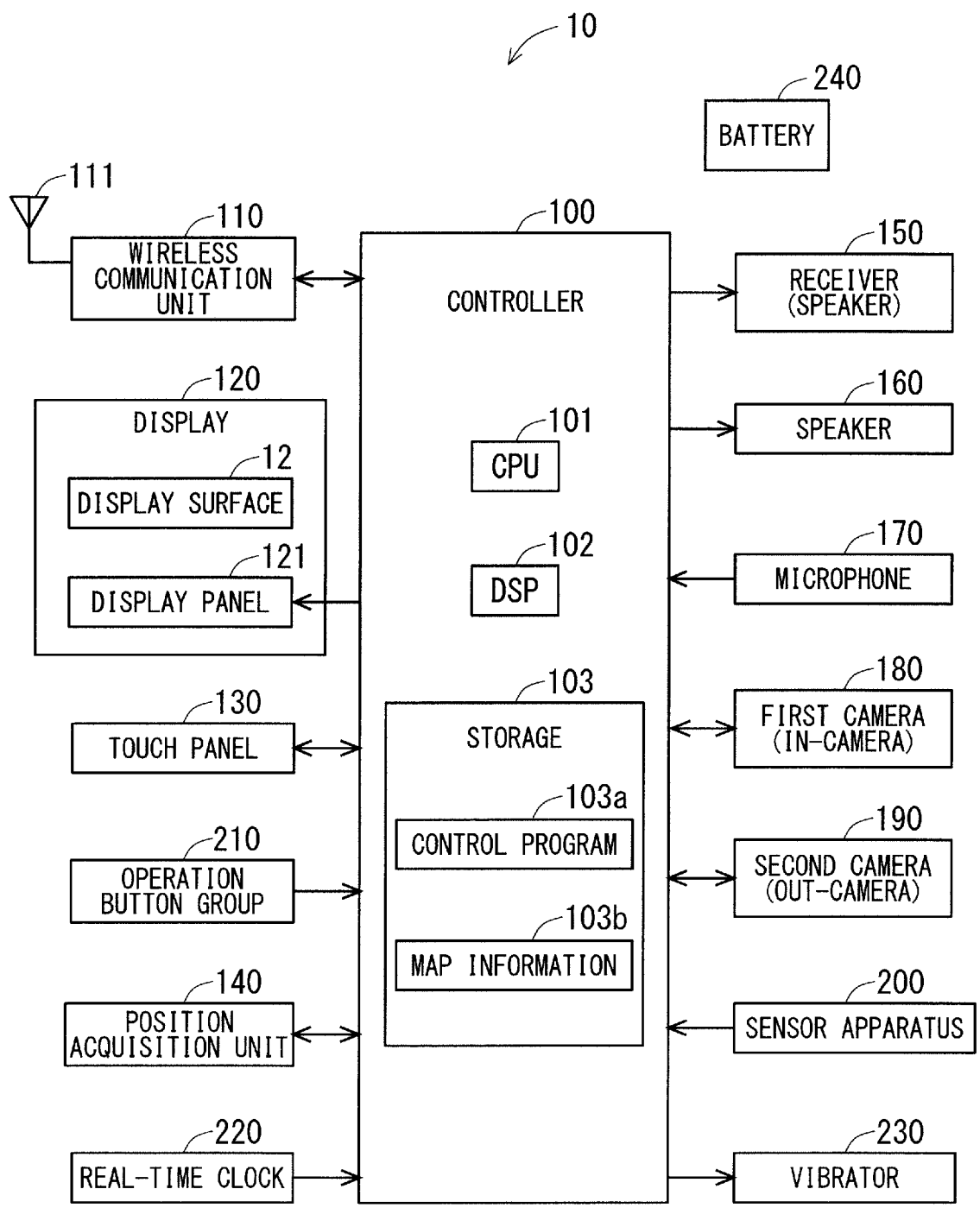
FIG. 4 is a block diagram illustrating one example of a configuration of the electronic apparatus.

FIG. 4 is a block diagram illustrating one example of an electrical configuration of the electronic apparatus 10 illustrated in FIGS. 2 and 3. As illustrated in FIG. 4, the electronic apparatus 10 comprises, for example, a controller 100, a wireless communication unit 110, a display 120, a touch panel 130, an operation button group 210, a position acquisition unit 140, and a real-time clock 220. The electronic apparatus 10 further comprises a receiver 150, a speaker 160, a microphone 170, a first camera 180, a second camera 190, a sensor apparatus 200, a vibrator 230, and a battery 240. These components of the electronic apparatus 10 are accommodated in the apparatus case 11.

The controller 100 can integrally manage operations of the electronic apparatus 10 by controlling other components of the electronic apparatus 10. It can also be said that the controller 100 is a control apparatus or a control circuit. The controller 100 comprises at least one processor for providing control and processing capability to perform various functions as described in further detail below.

In accordance with various embodiments, the at least one processor may be implemented as a single integrated circuit (IC) or as multiple communicatively coupled integrated circuits (ICs) and/or discrete circuits. It is appreciated that the at least one processor can be implemented in accordance with various known technologies.

In one embodiment, the processor comprises one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In one example, the controller 100 comprises a central processing unit (CPU) 101, a digital signal processor (DSP) 102, and a storage 103. The storage 103 comprises a non-transitory recording medium that can be read by the CPU 101 and the DSP 102, such as a read only memory (ROM) and a random access memory (RAM). The ROM of the storage 103 is, for example, a flash ROM (flash memory) being a non-volatile memory. The storage 103 stores map information 103b, a plurality of control programs 103a for controlling the electronic apparatus 10, etc. The map information 103b includes road information, railway line information for trains, facility information, etc. Various functions of the controller 100 are implemented by the CPU 101 and the DSP 102 executing the various control programs 103a in the storage 103.

The plurality of control programs 103a in the storage 103 include various applications (i.e., application programs). The storage 103 stores, for example, a phone application, a browser, a schedule management application, a camera application, a still image display application, a video player application, a music player application, a message communication application, etc.

The phone application is an application that allows the electronic apparatus 10 to perform phone communication by using the wireless communication unit 110, the receiver 150, the microphone 170, etc. It can be said that the phone application is an application that allows the user to place a call to a user of another electronic apparatus 10 by using the electronic apparatus 10. The phone communication includes a previously existing communication mode using a telephone line, and a communication mode using the Internet, which is referred to as Internet Protocol (IP) phone communication. The phone application for performing previously existing communication using a telephone line may be referred to as a "previously-existing phone application". Further, the phone application for performing IP phone communication may be referred to as an "IP phone application".

The storage 103 may store a plurality of types of phone applications. The plurality of types of phone applications in the storage 103 may include at least a type of previously-existing phone application, and may include at least a type of IP phone application.

The browser is an application that allows the electronic apparatus 10 to display a website. The schedule management application is an application for registering schedule information in the electronic apparatus 10. The camera application is an application that allows the electronic apparatus 10 to capture an image of an object by using the first camera 180 or the second camera 190. The still image display application is an application that allows the electronic apparatus 10 to display still images in the storage 103. The video player application is an application that allows the electronic apparatus 10 to play and display videos in the storage 103. The music player application is an application that allows the electronic apparatus 10 to play and output pieces of music in the storage 103.

The message communication application is an application that allows the electronic apparatus 10 to perform message communication by using the wireless communication unit 110 etc. The message communication includes a communication mode in which messages transmitted from a transmitter are once stored in the server apparatus and a receiver reads the messages from the server apparatus. The communication mode may be referred to as "electronic mail communication". The message communication further includes a communication mode that allows a receiver to immediately receive messages transmitted from a transmitter without reading the messages from the server apparatus, unlike the electronic mail communication. The communication mode may be referred to as "instant message communication". A message includes letters, symbols, etc. The message communication application for implementing the electronic mail communication may be hereinafter referred to as an "electronic mail application". Further, the message communication application for implementing the instant message communication may be referred to as an "IM application". The IM application may be referred to as an "instant messenger".

The storage 103 may store a plurality of types of message communication applications. The plurality of types of message communication applications in the storage 103 may include at least a type of electronic mail application, and may include at least a type of IM application.

The at least one application in the storage 103 may be an application stored in the storage 103 in advance. Further, the at least one application in the storage 103 may be an application stored in the storage 103 after being downloaded from another apparatus by the electronic apparatus 10.

Note that the configuration of the controller 100 is not limited to one example described above. For example, the controller 100 may comprise a plurality of CPUs 101. Alternatively, the controller 100 may omit the DSP 102, or may comprise a plurality of DSPs 102. Further, all of the functions of the controller 100 or some of the functions of the controller 100 may be implemented by a hardware circuit that does not require software to implement its functions. Further, the storage 103 may comprise a computer-readable non-transitory recording medium other than the ROM and the RAM. The storage 103 may comprise, for example, a small-size hard disk drive, a solid state drive (SSD), or the like.

The wireless communication unit 110 comprises an antenna 111. The wireless communication unit 110 can perform wireless communication by using the antenna 111 according to a plurality of types of wireless communication schemes, for example. The wireless communication of the wireless communication unit 110 is controlled by the controller 100. It can also be said that the wireless communication unit 110 is a wireless communication circuit.

The wireless communication unit 110 can perform wireless communication with the base station of the mobile phone system included in the network 2. The wireless communication unit 110 can communicate with another mobile phone device, web server, etc. via the base station.

Further, the wireless communication unit 110 can perform wireless communication by using the wireless LAN included in the network 2, such as WiFi. Further, the wireless communication unit 110 can perform short-range wireless communication directly with another apparatus without using the network 2. For example, the wireless communication unit 110 can perform wireless communication in conformity to Bluetooth (trademark). The wireless communication unit 110 may be able to perform wireless communication in conformity to at least one of ZigBee (trademark) and Near Field Communication (NFC).

The wireless communication unit 110 performs various types of processing, such as amplification processing, on a signal received by the antenna 111. Then, the wireless communication unit 110 outputs the processed signal to the controller 100. The controller 100 receives the signal, and performs various types of processing on the received signal to acquire information included in the received signal. In addition, the controller 100 includes information in a signal, and outputs the signal including information to the wireless communication unit 110. The wireless communication unit 110 receives the signal, and performs various types of processing, such as amplification processing, on the received signal. Then, the wireless communication unit 110 wirelessly transmits the processed signal from the antenna 111. The controller 100 causes the wireless communication unit 110 to transmit apparatus information of the electronic apparatus 10 to the server apparatus 50 as will be described later.

The display 120 comprises a display surface 12 located on the front surface of the electronic apparatus 10, and a display panel 121. The display 120 can display various pieces of information on the display surface 12. The display panel 121 is, for example, a liquid crystal display panel or an organic EL panel. When being controlled by the controller 100, the display panel 121 can display various pieces of information such as letters, symbols, and graphics. The display panel 121 faces the display surface 12 in the apparatus case 11. The information displayed on the display panel 121 is displayed on the display surface 12. It can be said that the display 120 is a notification unit that gives notifications to the user by performing display.

The touch panel 130 can detect operations performed by a pointer, such as a finger, on the display surface 12. The touch panel 130 is, for example, a projected electrostatic capacitive touch panel. The touch panel 130 is, for example, located on the back of the display surface 12. When the user performs an operation on the display surface 12 with a pointer such as a finger, the touch panel 130 can input an electric signal according to the operation to the controller 100. The controller 100 can determine details of the operation performed on the display surface 12, based on the electric signal (output signal) from the touch panel 130. Further, the controller 100 can perform processing according to the determined details of the operation.

When being operated by the user, each operation button 21 of the operation button group 210 can output an operation signal, which indicates that the operation button 21 has been operated, to the controller 100. In this manner, the controller 100 can judge whether or not each individual operation button 21 has been operated. When the controller 100 that has received the operation signal controls other components, a function assigned to the operated operation button 21 is executed in the electronic apparatus 10.

The position acquisition unit 140 can acquire position information indicating the position of the electronic apparatus 10. For example, the position acquisition unit 140 receives satellite signals transmitted by positioning satellites. Based on the received satellite signals, the position acquisition unit 140 can acquire position information of the electronic apparatus 10. The position information acquired by the position acquisition unit 140 includes, for example, latitude and longitude that represents the position of the electronic apparatus 10. It can be said that the position acquisition unit 140 is a position acquisition circuit.

The position acquisition unit 140 is, for example, a GPS receiver, and can receive wireless signals from positioning satellites of the Global Positioning System (GPS). For example, the position acquisition unit 140 uses the received wireless signals to calculate the current position of the electronic apparatus 10 in latitude and longitude, and outputs position information including the calculated latitude and longitude to the controller 100. It can also be said that the position information of the electronic apparatus 10 is position information of the user holding the electronic apparatus 10.

Note that the position acquisition unit 140 may calculate the position information of the electronic apparatus 10, based on signals from positioning satellites of a system other than the GPS, such as the Global Navigation Satellite System (GNSS). For example, the position acquisition unit 140 may calculate the position information of the electronic apparatus 10, based on signals from positioning satellites of systems such as the Global Navigation Satellite System (GLONASS), the Indian Regional Navigational Satellite System (IRNSS), COMPASS, Galileo, and the Quasi-Zenith Satellites System (QZSS).

The electronic apparatus 10 may omit the position acquisition unit 140. In this case, the electronic apparatus 10 may be connected to such a separately provided position acquisition unit 140 by wireless or wired means.

The microphone 170 can convert sound input from the outside of the electronic apparatus 10 into an electric sound signal, and output the converted electric sound signal to the controller 100. The microphone 170 functions as a sound input unit that can convert input sound into a sound signal and output the converted sound signal. The sound from the outside of the electronic apparatus 10 is taken into the electronic apparatus 10 through the microphone hole 15, and is input to the microphone 170.

Note that the microphone 170 may be located outside of the apparatus case 11, and perform short-range wireless communication with the wireless communication unit 110 in conformity to Bluetooth, for example. In this case, the sound signal output through the microphone 170 is input to the controller 100 via the wireless communication unit 110.

The speaker 160 is, for example, a dynamic speaker. The speaker 160 can convert an electric sound signal from the controller 100 into sound, and output the converted sound. The speaker 160 functions as a sound output unit that can convert an input sound signal into sound and output the converted sound. The sound output through the speaker 160 is externally output through the speaker hole 14. The user can hear the sound output through the speaker hole 14 at a place away from the electronic apparatus 10. It can be said that the speaker 160 is a notification unit that gives notifications to the user by outputting sound.

Note that the speaker 160 may be located outside of the apparatus case 11, and perform short-range wireless communication with the wireless communication unit 110 in conformity to Bluetooth, for example. In this case, the sound signal output from the controller 100 is input to the speaker 160 via the wireless communication unit 110.

The receiver 150 can output received voice sound. It can also be said that the receiver 150 is a speaker 150. The receiver 150 is, for example, a dynamic speaker. The receiver 150 can convert an electric sound signal from the controller 100 into sound, and output the converted sound. The receiver 150 functions as a sound output unit that can convert an input sound signal into sound and output the converted sound. The sound output through the receiver 150 is externally output through the receiver hole 13. The volume of the sound output through the receiver hole 13 is smaller than the volume of the sound output through the speaker hole 14. The user can hear the sound output through the receiver hole 13 by bringing their ear close to the receiver hole 13. It can be said that the receiver 150 is a notification unit that gives notifications to the user by outputting sound. Note that, instead of the receiver 150, a vibration element for vibrating a front surface portion of the apparatus case 11, such as a piezoelectric vibration element, may be provided. In this case, the sound is transferred to the user through vibration of the front surface portion.

The first camera 180 comprises a lens 181, an image sensor, etc. The second camera 190 comprises a lens 191, an image sensor, etc. Each of the first camera 180 and the second camera 190 can capture an image of an object according to control of the controller 100, generate a still image or a video of the captured object, and output the generated still image or video to the controller 100.

The lens 181 of the first camera 180 is visually recognizable on the front surface 11a of the apparatus case 11. This configuration allows the first camera 180 to capture an image of an object that is present on the front surface side (display surface 12 side) of the electronic apparatus 10. The first camera 180 is referred to as an in-camera. In contrast, the lens 191 of the second camera 190 is visually recognizable on the back surface 11b of the apparatus case 11. This configuration allows the second camera 190 to capture an image of an object that is present on the back surface side of the electronic apparatus 10. The second camera 190 is referred to as an out-camera.

The sensor apparatus 200 comprises at least one sensor. In one example, the sensor apparatus 200 comprises, for example, an accelerometer, an atmospheric pressure sensor, a geomagnetic sensor, and a gyro sensor. The accelerometer is, for example, a three-axis accelerometer that can detect acceleration of the electronic apparatus 10. The accelerometer can detect acceleration in the x-axis direction, the y-axis direction, and the z-axis direction that are set in the electronic apparatus 10. The x-axis direction, the y-axis direction, and the z-axis direction are set in, for example, the longitudinal direction, the transverse direction, and the thickness direction of the electronic apparatus 10, respectively. The atmospheric pressure sensor can detect atmospheric pressure surrounding the electronic apparatus 10. The geomagnetic sensor is, for example, a three-axis geomagnetic sensor that can detect a magnetic field surrounding the electronic apparatus 10. The geomagnetic sensor can detect a magnetic field in the x-axis direction, the y-axis direction, and the z-axis direction that are set in the electronic apparatus 10. The gyro sensor is, for example, a three-axis gyro sensor that can detect angular velocity of the electronic apparatus 10. The gyro sensor can detect angular velocity about each axis of the x-axis, the y-axis, and the z-axis that are set in the electronic apparatus 10.

Note that the sensor apparatus 200 may omit at least one sensor out of the accelerometer, the atmospheric pressure sensor, the geomagnetic sensor, and the gyro sensor. In this case, the electronic apparatus 10 may be connected to such separately provided at least one sensor by wireless or wired means. Further, the sensor apparatus 200 may comprise a sensor other than the accelerometer, the atmospheric pressure sensor, the geomagnetic sensor, and the gyro sensor. For example, the sensor apparatus 200 may comprise at least one of a proximity sensor, an illuminometer, and a temperature sensor. Further, the electronic apparatus 10 may be connected to such a separately provided sensor other than the accelerometer, the atmospheric pressure sensor, the geomagnetic sensor, and the gyro sensor by wireless or wired means.

The real-time clock 220 measures the current time and notifies the controller 100 of the measured current time. The vibrator 230 can vibrate the electronic apparatus 10. Specifically, the vibrator 230 can vibrate the apparatus case 11 according to control of the controller 100. The vibrator 230 can give a notification to the user holding the electronic apparatus 10 by vibrating the apparatus case 11. The vibrator 230 comprises, for example, an eccentric motor. It can be said that the vibrator 230 is a notification unit that gives notifications to the user by vibrating the apparatus case 11.

The battery 240 is, for example, a rechargeable battery. Power output from the battery 240 is supplied to various components of the electronic apparatus 10, such as the controller 100 and the wireless communication unit 110.

<Configuration Example of Server Apparatus>

FIG. 5 is a diagram illustrating one example of a configuration of the server apparatus 50. As illustrated in FIG. 5, the server apparatus 50 comprises, for example, a controller 51, a communication unit 54 to be connected to the network 2, and a display 55.

The display 55 is, for example, a liquid crystal display panel or an organic EL panel. When being controlled by the controller 51, the display 55 can display various pieces of information such as letters, symbols, and graphics.

The controller 51 can integrally manage operations of the server apparatus 50 by controlling other components of the server apparatus 50. It can also be said that the controller 51 is a control apparatus or a control circuit. The controller 51 comprises at least one processor for providing control and processing capability to perform various functions as described in further detail below. The above description of the processor of the controller 100 of the electronic apparatus 10 applies to the processor of the controller 51 as well.

In one example, the controller 51 comprises a CPU 52 and a storage 53. The storage 53 comprises a non-transitory recording medium that can be read by the CPU 52, such as a ROM and a RAM. The ROM of the storage 53 is, for example, a flash ROM being a non-volatile memory. The storage 53 stores a plurality of control programs 53a for controlling the server apparatus 50. The storage 53 further stores apparatus information 300 transmitted by the electronic apparatus 10. In the storage 53, the apparatus information 300 is managed for each individual electronic apparatus 10. The various functions of the controller 51 are implemented by the CPU 52 executing the various control programs 53a in the storage 53.

The communication unit 54 is connected to the network 2 by wired or wireless means. The communication unit 54 can communicate with an apparatus connected to the network 2, such as the electronic apparatus 10, via the network 2. The communication unit 54 can input information received from the network 2 to the controller 51. Further, the communication unit 54 can output information received from the controller 51 to the network 2.

The configuration of the server apparatus 50 is not limited to one example of FIG. 5. For example, the controller 51 may comprise a plurality of CPUs 52. Further, the controller 51 may comprise at least one DSP. Further, all of the functions of the controller 51 or some of the functions of the controller 51 may be implemented by a hardware circuit that does not require software to implement its functions.

Further, the storage 53 may comprise a computer-readable non-transitory recording medium other than the ROM and the RAM. The storage 53 may comprise, for example, a small-size hard disk drive, an SSD, or the like. At least one of the control programs 53a in the storage 53 may be a program stored in the storage 53 in advance.

Further, the at least one of the control programs 53a in the storage 53 may be a program stored in the storage 53 after being downloaded from another apparatus by the server apparatus 50.

The server apparatus 50 may comprise components other than the controller 51, the communication unit 54, and the display 55. The server apparatus 50 may comprise an input apparatus that allows the user to input information to the server apparatus 50, such as a touch panel.

<Display Example of Electronic Apparatus>

Figure 6:
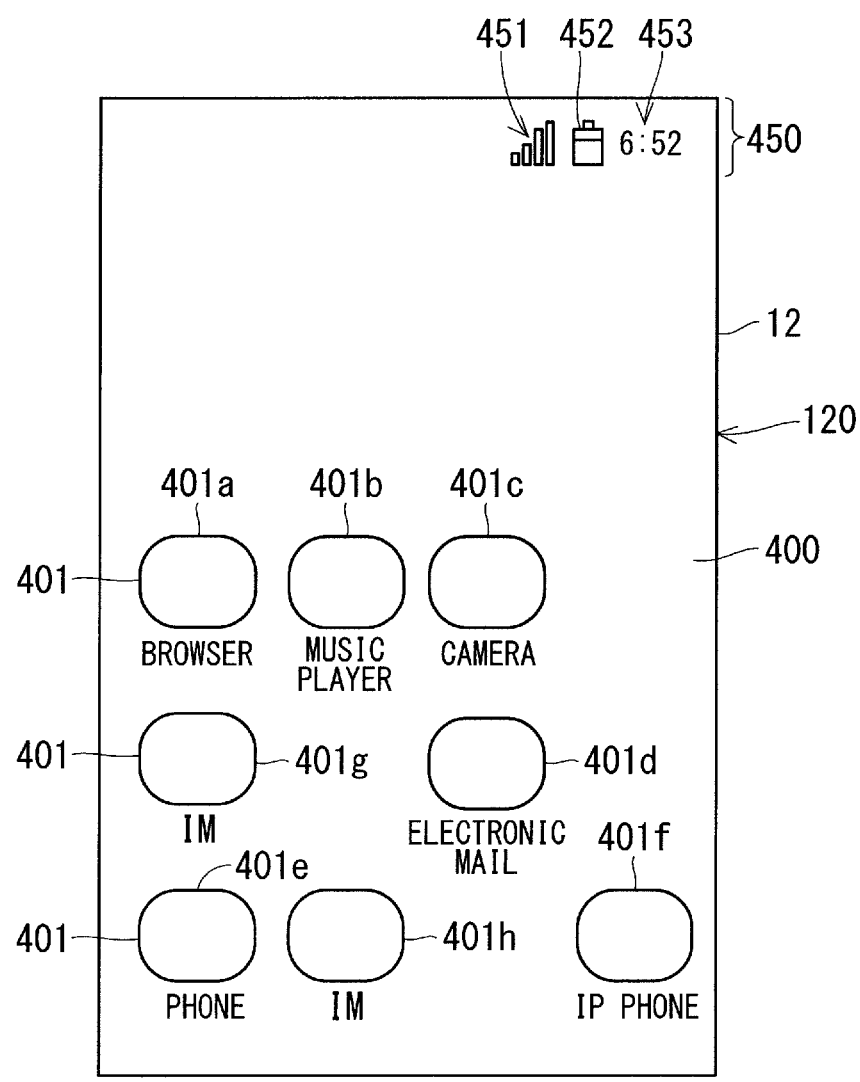
FIG. 6 is a diagram illustrating one example of display of the electronic apparatus.

FIG. 6 is a diagram illustrating a display example of the electronic apparatus 10. FIG. 6 schematically illustrates one example of a home screen 400. As illustrated in FIG. 6, icons 401 are shown on the home screen 400 that is displayed on the display surface 12. Each of the icons 401 corresponds to one application in the storage 103, and is used to command the electronic apparatus 10 to execute the corresponding application.

In one example of FIG. 6, the home screen 400 comprises an icon 401a corresponding to the browser, an icon 401b corresponding to the music player application, an icon 401c corresponding to the camera application, and an icon 401d corresponding to the electronic mail application. The home screen 400 further comprises an icon 401e corresponding to the previously-existing phone application and an icon 401f corresponding to the IP phone application. The home screen 400 further comprises two icons 401g and 401h corresponding to two respective types of IM applications provided by different companies, for example.

The user can select one icon 401 comprised in the home screen 400 by performing a predetermined operation (for example, a tap operation) on the icon 401. The controller 100 reads an application corresponding to the selected icon 401 from the storage 103 and executes the read application. Specifically, when the touch panel 130 detects a predetermined operation performed on one icon 401, the controller 100 reads an application corresponding to the icon 401 and executes the read application. In this manner, the user can select an icon 401 by operating the icon 401, and cause the electronic apparatus 10 to execute an application corresponding to the selected icon 401. For example, when the user performs a tap operation on the icon 401d corresponding to the electronic mail application, the electronic mail application is executed in the electronic apparatus 10. Further, when the user performs a tap operation on the icon 401e corresponding to the previously-existing phone application, the previously-existing phone application is executed in the electronic apparatus 10.

A notification area 450 for giving notifications about a state of the electronic apparatus 10 is comprised in every screen displayed on the display surface 12, including the home screen 400. The notification area 450 is also referred to as a status bar. As illustrated in FIG. 6, the notification area 450 comprises, for example, an icon 451 representing a communication state of the wireless communication unit 110, an icon 452 representing the remaining amount of the battery 240, and an icon 453 representing the current time acquired by the real-time clock 220.

Further, when a specific event occurs in the electronic apparatus 10, information related to the occurring event is shown in the notification area 450. The information includes, for example, an icon for giving a notification about reception of a new message, an icon for giving a notification about a missed call, etc.

In the following description provided for the display example of the electronic apparatus 10, illustration of the notification area 450 may be omitted when the notification area 450 is not particularly relevant to the subject being described.

<Operation Example of Electronic Apparatus>
<One Example of Incoming Call/Message Notification of Electronic Apparatus>

When the electronic apparatus 10 receives an incoming call, i.e., receives an outgoing call of phone communication from the other-party apparatus 10, the electronic apparatus 10 gives an incoming call notification about the phone communication to the subject apparatus user. Further, when the electronic apparatus 10 receives a message (i.e., incoming message) transmitted by the other-party apparatus 10 through message communication, the electronic apparatus 10 gives an incoming message notification about the message communication to the subject apparatus user. The outgoing call of phone communication may be hereinafter referred to as an "outgoing phone call". Further, the incoming call notification of phone communication may be hereinafter referred to as an "incoming phone call notification", and the incoming message notification of message communication may be hereinafter referred to as an "incoming message notification". Further, the incoming call of phone communication may be hereinafter referred to as an "incoming phone call".

The electronic apparatus 10 can give an incoming phone call notification and an incoming message notification by using the display 120, the speaker 160, and the vibrator 230, for example. For example, while the electronic apparatus 10 receives an incoming call of phone communication (which may be hereinafter replaced by the expression "during reception of an incoming phone call"), the controller 100 causes the display 120 to display an incoming call notification screen for giving a notification about the incoming phone call. In this manner, the electronic apparatus 10 can give an incoming phone call notification to the subject apparatus user. It can also be said that the incoming call notification screen serves as incoming call notification information for giving a notification about an incoming phone call. Further, during reception of an incoming phone call, the controller 100 causes the speaker 160 to output a ringtone for phone communication (which may be hereinafter referred to as a "phone ringtone"). In this manner, the electronic apparatus 10 can give an incoming phone call notification to the subject apparatus user. The incoming phone call notification may be referred to as an "incoming phone call notification using sound". Further, during reception of an incoming phone call, the controller 100 causes the vibrator 230 to vibrate the apparatus case 11. In this manner, the electronic apparatus 10 can give an incoming phone call notification to the subject apparatus user. The incoming phone call notification may be referred to as an "incoming phone call notification using vibration".

In a similar manner, the controller 100 causes the display 120 to display information for giving a notification about the reception of the message in the notification area 450, for example, in response to the electronic apparatus 10 receiving a message. In this manner, the electronic apparatus 10 can give an incoming message notification to the subject apparatus user. Further, the controller 100 causes the speaker 160 to output a ringtone for message communication, in response to the electronic apparatus 10 receiving a message. In this manner, the electronic apparatus 10 can give an incoming message notification to the subject apparatus user. The incoming message notification may be referred to as an "incoming message notification using sound". Further, the controller 100 causes the vibrator 230 to vibrate the apparatus case 11, in response to the electronic apparatus 10 receiving a message. In this manner, the electronic apparatus 10 can give an incoming message notification to the subject apparatus user. The incoming message notification may be referred to as an "incoming message notification using vibration".

The user can adjust the settings of the electronic apparatus 10 related to the incoming call/message notification by operating the display surface 12, for example. For example, the user can adjust the settings of the electronic apparatus 10 related to the incoming phone call notification, as to whether or not to execute the incoming phone call notification using sound and whether or not to execute the incoming phone call notification using vibration. Further, the user can adjust the settings of the electronic apparatus 10 related to the incoming message notification, as to whether or not to execute the incoming message notification using sound and whether or not to execute the incoming message notification using vibration. Basically, the electronic apparatus 10 gives the incoming call/message notification according to the settings of related to the incoming call/message notification of the subject apparatus. As will be described later, however, the incoming call/message notification of the electronic apparatus 10 may in some cases be controlled by another electronic apparatus 10.

<Transmission of Apparatus Information>
In one example, the controller 100 of the electronic apparatus 10 can generate apparatus information of the subject apparatus, and cause the wireless communication unit 110 to transmit the generated apparatus information to the server apparatus 50.

In the electronic apparatus 10, for example, the controller 100 causes the wireless communication unit 110 to transmit the latest apparatus information to the server apparatus 50 once every certain period of time. Alternatively, the controller 100 may cause the wireless communication unit 110 to transmit apparatus information to the server apparatus 50 every time information included in the apparatus information is changed. Alternatively, the controller 100 may cause the wireless communication unit 110 to transmit the latest apparatus information to the server apparatus 50 every time the server apparatus 50 makes a transmission request for apparatus information. The electronic apparatus 10 transmits apparatus information of the subject apparatus along with identification information of the subject apparatus. As the identification information, for example, a telephone number assigned to the electronic apparatus 10 is adopted.

In the server apparatus 50, when the communication unit 54 acquires the apparatus information and the identification information of the electronic apparatus 10, the controller 51 stores the acquired apparatus information and identification information in the storage 53 by correlating both the pieces of information to each other. In this case, when the storage 53 stores old apparatus information that corresponds to the received identification information, the controller 51 stores the received apparatus information in the storage 53, instead of the old apparatus information. In this manner, the storage 53 stores the latest apparatus information of each electronic apparatus 10.

In one example, when the user of the electronic apparatus 10 is moving, movement information, which indicates a movement state of the user, is included in the apparatus information of the electronic apparatus 10. It can also be said that the movement information is information indicating a movement state of the electronic apparatus 10. For example, the controller 100 determines the movement state of the user, based on detection results obtained from the sensor apparatus 200. Then, the controller 100 generates apparatus information including the movement information indicating the determined movement state. The apparatus information may or may not include information other than the movement information. Note that, when the user of the electronic apparatus 10 is stopping without making any movement, the apparatus information of the electronic apparatus 10 does not include the movement information.

<One Example of Method of Determining Movement State>

The controller 100 can determine various movement states of the user. For example, the controller 100 can determine a state in which the user is moving on their own without riding any vehicle and a state in which the user is moving by riding a vehicle, based on detection results obtained from the accelerometer of the sensor apparatus 200, for example.

Here, a situation where the user moves on their own without riding a vehicle refers to a situation in which the user moves on their own feet without riding any vehicle. The state in which the user is moving on their own without riding a vehicle is referred to as a "non-vehicle movement state". In this case, it can be said that the controller 100 can determine the non-vehicle movement state of the user, based on detection results obtained from the accelerometer of the sensor apparatus 200. The detection results obtained from the accelerometer of the sensor apparatus 200 may be hereinafter referred to as "acceleration detection results".

As the non-vehicle movement state of the user, the controller 100 can determine a state in which the user is moving by walking and a state in which the user is moving by running. The former state is referred to as a "walking state" and the latter state is referred to as a "running state". In this case, the controller 100 can determine the walking state and the running state of the user, based on acceleration detection results.

Further, as the state in which the user is moving by riding a vehicle, the controller 100 can determine a state in which the user is moving by riding a bicycle and a state in which the user is moving by riding a vehicle that allows the user to move faster than a bicycle, such as a motor vehicle, a train, and a bus. To distinguish between a bicycle and a vehicle that allows the user to move faster than a bicycle, the term "vehicle" by itself hereinafter refers to the vehicle that allows the user to move faster than a bicycle.

The state in which the user is moving by riding a bicycle is referred to as a "bicycle movement state", and the state in which the user is moving by riding a vehicle is referred to as a "vehicle movement state". In this case, the controller 100 can determine the bicycle movement state and the vehicle movement state of the user, based on acceleration detection results.

Here, as a known fact, acceleration of the electronic apparatus 10 exhibits a time-varying pattern specific to a movement state of the user holding the electronic apparatus 10. When the time-varying pattern of acceleration detected by the accelerometer of the sensor apparatus 200 exhibits a pattern specific to the walking state, the controller 100 determines that the movement state of the user is the walking state. Further, when the time-varying pattern of acceleration detected by the accelerometer exhibits a pattern specific to the "running state", the controller 100 determines that the movement state of the user is the running state. Further, when the time-varying pattern of acceleration detected by the accelerometer exhibits a pattern specific to the bicycle movement state, the controller 100 determines that the movement state of the user is the bicycle movement state. Further, when the time-varying pattern of acceleration detected by the accelerometer exhibits a pattern specific to the vehicle movement state, the controller 100 determines that the movement state of the user is the vehicle movement state.

Further, when the movement state of the user is the vehicle movement state, the controller 100 can determine a state in which the user is moving by riding a train. The state in which the user is moving by riding a train may be hereinafter referred to as a "train movement state".

For example, when the controller 100 determines that the movement state of the user is the vehicle movement state and the position of the subject apparatus is located on a railway line of a train, the controller 100 determines that the movement state of the user is the train movement state. In this case, for example, the controller 100 uses a position indicated by the position information acquired by the position acquisition unit 140 as the position of the subject apparatus. Further, the controller 100 can determine a position of the railway line of the train, based on the map information 103*b* in the storage 103.

When the movement state of the user is the vehicle movement state but is not the train movement state, the controller 100 determines that the movement state of the user is another vehicle movement state.

In this manner, as the movement state of the user, the controller 100 can determine the walking state, the running state, the bicycle movement state, the train movement state, and the another vehicle movement state. When the controller 100 determines that the movement state of the user is the walking state, the controller 100 generates movement information indicating that the movement state of the user is the non-vehicle movement state. When the controller 100 determines that the movement state of the user is the running state, the controller 100 generates movement information indicating that the movement state of the user is the non-vehicle movement state. When the controller 100 determines that the movement state of the user is the train movement state, the controller 100 generates movement information indicating that the movement state of the user is the train movement state. When the controller 100 determines that the movement state of the user is the another vehicle movement state, the controller 100 generates movement information indicating that the movement state of the user is the another vehicle movement state. Note that the method of determining the movement state of the user is not limited to examples described above.

<Operation Example of Electronic Apparatus after Phone Application is Started>

In one example, after the phone application is started, the electronic apparatus 10 can perform processing based on apparatus information of the other-party apparatus 10, in response to receiving a place call command of phone communication to be performed with the other-party apparatus 10 issued by the subject apparatus user. Because the user can use such an electronic apparatus 10 as described above, convenience of the electronic apparatus 10 is enhanced.

FIG. 7 is a flowchart illustrating one example of operation of the electronic apparatus 10 after the phone application is started. When the touch panel 130 detects a tap operation performed on the icon 401*e* or the icon 401*f* described above, the controller 100 of the electronic apparatus 10 reads a phone application corresponding to the tapped icon 401 from the storage 103, and executes the read phone application. In this manner, the phone application is started.

After the phone application is started, in Step s1, when the controller 100 determines that the subject apparatus has received input of a place call command of phone communication to be performed with the other-party apparatus 10 issued by the subject apparatus user, based on an output signal from the touch panel 130, the controller 100 executes Step s2.

The term "place call command" by itself hereinafter refers to a place call command of phone communication. Further, when the electronic apparatus 10 receives input of a place call command of phone communication to be performed with a certain other-party apparatus 10, this other-party apparatus 10 may be referred to as a "target other-party apparatus 10". Further, a user of the target other-party apparatus 10 may be referred to as a "target other-party user". Further, the electronic apparatus 10 that has received input of a place call command may be referred to as a "place call command-received apparatus 10" or a "command-received apparatus 10".

Figure 8:
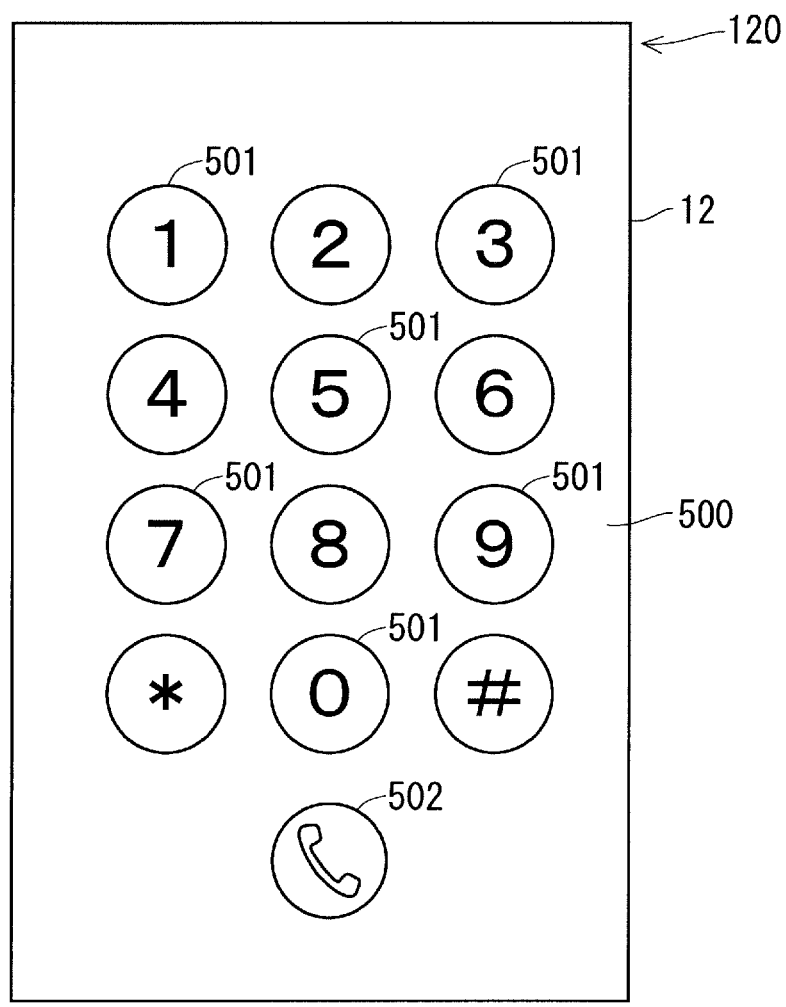
FIG. 8 is a diagram illustrating one example of display of the electronic apparatus.

FIG. 8 is a diagram illustrating a display example when the phone application is executed. FIG. 8 illustrates a display example when the previously-existing phone application is executed. FIG. 8 illustrates one example of an input screen 500 for enabling input of a telephone number that is assigned to the other-party apparatus 10 with which phone communication is to be performed. The input screen 500 may be referred to as a dial pad or a keypad.

As illustrated in FIG. 8, the input screen 500 comprises twelve input buttons 501 for enabling input of symbols such as numbers. Each input button 501 is assigned a symbol. For example, when a tap operation is performed on the input button 501, a symbol assigned to the tapped input button 501 is input to the electronic apparatus 10. The user can input the telephone number of the other-party apparatus 10 to the electronic apparatus 10 by operating a plurality of input buttons 501.

The input screen 500 further comprises a place call command button 502 for inputting a place call command to the electronic apparatus 10. For example, when a tap operation is performed on the place call command button 502, a place call command is input to the electronic apparatus 10. The user can input a place call command of phone communication to be performed with the other-party apparatus 10 to the electronic apparatus 10 by inputting the telephone number of the other-party apparatus 10 to the electronic apparatus 10 and then operating the place call command button 502.

The method in which the user inputs a place call command to the electronic apparatus 10 is not limited to one example described above. For example, the user can input a place call command to the electronic apparatus 10 by using an address book (also referred to as a phone book) in the storage 103. In this case, for example, the user performs a predetermined operation on the display surface 12 to cause the electronic apparatus 10 to display the telephone number of the other-party apparatus 10 included in the address book of the storage 103 on the display surface 12. Then, for example, the user performs a tap operation on the telephone number of the other-party apparatus 10 displayed on the display surface 12. Through such operation, the user can input a place call command of phone communication to be performed with the other-party apparatus 10 to the electronic apparatus 10. Alternatively, the user may input a place call command to the electronic apparatus 10 by using an incoming phone call history or an outgoing phone call history displayed on the display surface 12. Further, the user may input a place call command to the electronic apparatus 10 by inputting predetermined voice to the microphone 170.

Note that, in one example described above, a telephone number is used as identification information of the other-party apparatus 10 that is used when the electronic apparatus 10 performs phone communication with the other-party apparatus 10. However, in the IP phone application, identification information other than a telephone number may be used.

In Step s2, the controller 100 generates a first request signal for requesting the server apparatus 50 to transmit apparatus information of the target other-party apparatus 10. The first request signal includes identification information of the target other-party apparatus 10. Then, the controller 100 causes the wireless communication unit 110 to transmit the first request signal to the server apparatus 50.

In the server apparatus 50 that has received the first request signal, the controller 51 reads apparatus information that corresponds to the identification information included in the first request signal from the storage 53. Then, the server apparatus 50 transmits the read apparatus information to the place call command-received apparatus 10. In this manner, the place call command-received apparatus 10 can acquire the apparatus information of the target other-party apparatus 10.

After Step s2, in Step s3, when the wireless communication unit 110 acquires the apparatus information of the target other-party apparatus 10 from the server apparatus 50, in Step s4, the controller 100 executes processing based on the acquired apparatus information. A specific example of Step s4 will be described later in detail.

Note that the controller 100 may register the acquired apparatus information in the address book in the storage 103. In this case, the controller 100 may register the apparatus information of the other-party apparatus 10 in the address book by correlating the apparatus information to the telephone number of the other-party apparatus 10. In this manner, when the electronic apparatus 10 displays the address book, the user can check the apparatus information.

Figure 9:
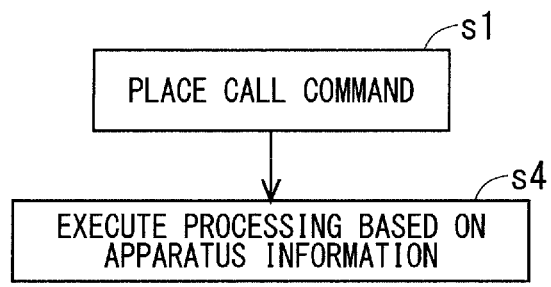
FIG. 9 is a flowchart illustrating one example of operation of the electronic apparatus.

Further, in one example described above, the electronic apparatus 10 transmits the first request signal to the server apparatus 50 with the place call command being a trigger for the transmission. However, the electronic apparatus 10 may transmit the first request signal to the server apparatus 50 with another condition being the trigger. For example, the electronic apparatus 10 may transmit the first request signal to the server apparatus 50 once every certain period of time. In this case, as illustrated in FIG. 9, Steps s2 and s3 are not required, and in Step s4, the command-received apparatus 10 executes processing based on the most recently acquired apparatus information.

Further, the electronic apparatus 10 may acquire the apparatus information from the other-party apparatus 10 that is related to the place call command, without using the server apparatus 50. In this case, for example, in Step s2, the controller 100 of the command-received apparatus 10 causes the wireless communication unit 110 to transmit a second request signal to the target other-party apparatus 10. The second request signal is a signal for requesting the target other-party apparatus 10 to transmit apparatus information. In the target other-party apparatus 10, when the wireless communication unit 110 receives the second request signal, the controller 100 causes the wireless communication unit 110 to transmit the latest apparatus information of the subject apparatus to the command-received apparatus 10. In the command-received apparatus 10, when the wireless communication unit 110 acquires the apparatus information of the target other-party apparatus 10 in Step s3, in Step s4, the controller 100 executes processing based on the acquired apparatus information.

Further, the electronic apparatus 10 may transmit the second request signal to the other-party apparatus 10 with a condition other than the place call command being the trigger. For example, the electronic apparatus 10 may transmit the second request signal to the other-party apparatus 10 once every certain period of time. In this case, as illustrated in FIG. 9 described above, Steps s2 and s3 are not required, and in Step s4, the command-received apparatus 10 executes processing based on the most recently acquired apparatus information.

Further, the electronic apparatus 10 may voluntarily transmit apparatus information of the electronic apparatus 10 to another electronic apparatus 10, instead of transmitting the apparatus information in response to a request made by another electronic apparatus 10. For example, the electronic apparatus 10 may transmit the apparatus information of the subject apparatus to another electronic apparatus 10 once every certain period of time. In this case, as in FIG. 9, Steps s2 and s3 are not required, and in Step s4, the command-received apparatus 10 performs processing based on the apparatus information that is most recently acquired from the target other-party apparatus 10.

Note that, when the electronic apparatus 10 acquires apparatus information from the server apparatus 50 or from another electronic apparatus 10, a wireless communication scheme with high communication speed and low latency may be used, such as a wireless communication scheme conforming to the fifth generation mobile communication systems (5G). For example, a wireless communication scheme conforming to 5G may be used in Steps s2 and s3 described above.

As described above, after the phone application is started, the electronic apparatus 10 according to one example can perform processing based on the apparatus information of the other-party apparatus 10, in response to receiving a place call command of phone communication to be performed with the other-party apparatus 10 issued by the subject apparatus user. Because the user can use such an electronic apparatus 10 as described above, convenience of the electronic apparatus 10 is enhanced. The following is a description of a plurality of specific examples of Step s4.

First Example

In one example, the controller 100 of the target electronic apparatus 10 executing the phone application can perform the following operation. Specifically, when the other-party apparatus 10 outputs voice which is input to the microphone 170 of the subject apparatus and is transmitted by the wireless communication unit 110 of the subject apparatus through the receiver 150 or the speaker 160 of the other-party apparatus 10, the controller 100 of the subject apparatus can execute control processing of controlling the other-party apparatus 10 so that the other-party apparatus 10 executes the message communication application without transmitting voice that is input to the microphone 170 of the other-party apparatus 10 to the target electronic apparatus 10.

Figure 10:
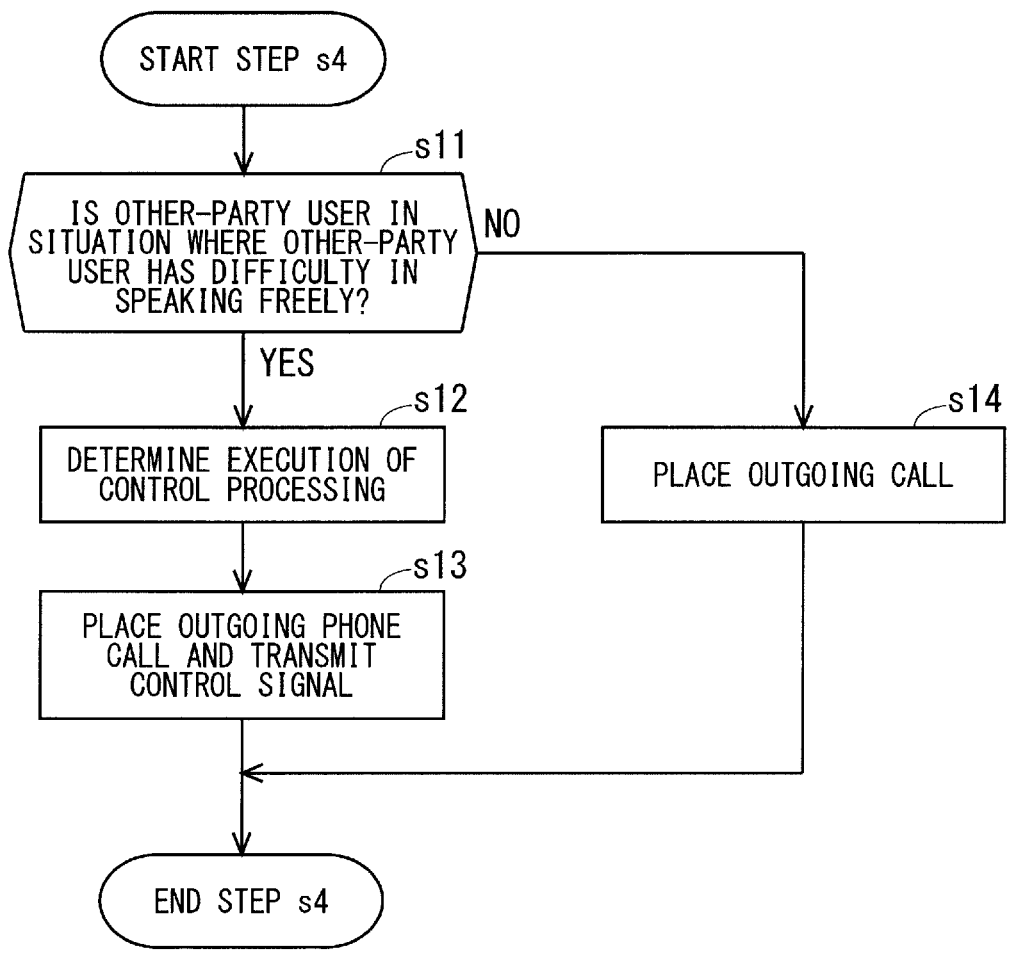
FIG. 10 is a flowchart illustrating one example of operation of the electronic apparatus.

In Step s4 according to one example, the controller 100 of the command-received apparatus 10 determines execution of the control processing, based on the apparatus information of the target other-party apparatus 10. This configuration enhances convenience of the electronic apparatus 10. FIG. 10 is a flowchart illustrating Step s4 according to one example.

As illustrated in FIG. 10, in Step s11, the controller 100 of the command-received apparatus 10 determines whether or not the target other-party user is in a situation where the target other-party user has difficulty in speaking freely, based on the apparatus information of the target other-party apparatus 10. In Step s11, for example, the controller 100 determines the movement state of the target other-party user, based on the movement information included in the apparatus information. If the controller 100 determines that the movement state of the target other-party user is the train movement state, the controller 100 determines that the target other-party user is in a situation where the target other-party user has difficulty in speaking freely. In contrast, if the controller 100 determines that the movement state of the target other-party user is a state other than the train movement state, the controller 100 determines that the target other-party user is not in a situation where the target other-party user has difficulty in speaking freely.

If the process proceeds to NO in Step s11, Step s14 is executed. In Step s14, the command-received apparatus 10 places an outgoing call of phone communication to the target other-party apparatus 10. In the target other-party apparatus 10 that has received the outgoing call placed in Step s14, the controller 100 starts the phone application in the storage 103. Then, the target other-party apparatus 10 gives an incoming phone call notification according to the settings related to the incoming call notification of the subject apparatus.

When the target other-party apparatus 10 answers the incoming call of phone communication performed with the command-received apparatus 10 in response to a command issued by the target other-party user, phone communication is performed between the command-received apparatus 10 and the target other-party apparatus 10.

The command-received apparatus 10 performing the phone communication transmits voice that is input to the microphone 170 serving as a voice input unit to the target other-party apparatus 10. Specifically, the controller 100 of the command-received apparatus 10 causes the wireless communication unit 110 to transmit a voice signal transmitted from the microphone 170 to the target other-party apparatus 10. The target other-party apparatus 10 performing the phone communication outputs the voice received from the command-received apparatus 10 through the receiver 150 or the speaker 160. Specifically, the controller 100 of the target other-party apparatus 10 inputs, to the receiver 150 or the speaker 160, the voice signal that is received by the wireless communication unit 110 from the command-received apparatus 10. In this manner, voice of the user of the command-received apparatus 10 is output through the receiver 150 or the speaker 160 of the target other-party apparatus 10. In other words, voice of the user of the command-received apparatus 10 is output through a voice output unit of the target other-party apparatus 10. Further, the target other-party apparatus 10 performing the phone communication transmits voice input to the microphone 170 to the command-received apparatus 10, similarly to the command-received apparatus 10 performing the phone communication. The command-received apparatus 10 performing the phone communication outputs voice transmitted from the target other-party apparatus 10 through the receiver 150 or the speaker 160, similarly to the target other-party apparatus 10 performing the phone communication.

In contrast, if the process proceeds to YES in Step s11, in Step s12, the controller 100 determines execution of the control processing. Subsequently, Step s13 is executed. In Step s13, the controller 100 of the command-received apparatus 10 generates a first control signal. The first control signal is a signal for commanding the target other-party apparatus 10 to execute the message communication application without transmitting voice input to the microphone 170 of the target other-party apparatus 10 to the command-received apparatus 10. Then, in Step s13, the command-received apparatus 10 places an outgoing phone call to the target other-party apparatus 10 and transmits the generated first control signal to the target other-party apparatus 10.

In the target other-party apparatus 10 that has received the outgoing phone call placed by the command-received apparatus 10 and that has received the first control signal from the command-received apparatus 10, the controller 100 starts the phone application in the storage 103. Then, the target other-party apparatus 10 gives an incoming phone call notification according to the settings related to the incoming call notification of the subject apparatus. Subsequently, when the target other-party apparatus 10 answers the incoming call of phone communication performed with the command-received apparatus 10 in response to a command issued by the target other-party user, communication in a mode different from that of the phone communication is performed between the target other-party apparatus 10 and the command-received apparatus 10. In the mode of the communication, the command-received apparatus 10 transmits voice, whereas the target other-party apparatus 10 transmits messages. The communication may be referred to as "modified phone communication".

The command-received apparatus 10 performing the modified phone communication transmits voice input to the microphone 170 of the subject apparatus to the target other-party apparatus 10, similarly to the phone communication. Further, the target other-party apparatus 10 performing the modified phone communication outputs voice that is received from the command-received apparatus 10 through the receiver 150 or the speaker 160, similarly to the phone communication. In this manner, similarly to the phone communication, voice of the user of the command-received apparatus 10 is transmitted from the command-received apparatus 10 to the target other-party apparatus 10, and voice of the user of the command-received apparatus 10 is output through the receiver 150 or the speaker 160 of the target other-party apparatus 10.

Further, the target other-party apparatus 10 performing the modified phone communication performs processing according to the first control signal received from the command-received apparatus 10. Specifically, unlike the phone communication, the target other-party apparatus 10 does not transmit voice input to the microphone 170 to the command-received apparatus 10. In this case, the voice input to the microphone 170 may be inhibited from being transmitted to the command-received apparatus 10 by the controller 100 of the target other-party apparatus 10 stopping operation of the microphone 170, or the voice input to the microphone 170 may be inhibited from being transmitted to the command-received apparatus 10 by the controller 100 purposely not inputting a voice signal that is output from the microphone 170 to the wireless communication unit 110. Unlike the phone communication, in the command-received apparatus 10 performing the modified phone communication, voice of the target other-party user is not output through the receiver 150 or the speaker 160.

Further, in the target other-party apparatus 10 performing the modified phone communication, the controller 100 executes the message communication application in the storage 103, according to the first control signal that is received by the target other-party apparatus 10 from the command-received apparatus 10. In this manner, in the target other-party apparatus 10, the phone application and the message communication application are simultaneously executed. The controller 100 of the target other-party apparatus 10 that has received the first control signal from the command-received apparatus 10 starts the IM application, for example.

In the target other-party apparatus 10 that has started the message communication application, the touch panel 130 detects a transmission destination selection operation being an operation of selecting a message transmission destination, a message input operation, and a message transmit command operation (i.e., a transmit message command operation), each of which is performed on the display surface 12. The target other-party user selects the command-received apparatus 10 as the message transmission destination. Subsequently, the controller 100 transmits a message input by the target other-party user to the selected other-party apparatus 10, i.e., the command-received apparatus 10. In other words, the controller 100 transmits a message that is generated according to the input operation performed by the target other-party user to the command-received apparatus 10. Note that the controller 100 of the target other-party apparatus 10 may arrange that the message transmission destination is automatically set to the command-received apparatus 10 when the controller 100 executes the message communication application. With this configuration, the target other-party user no longer needs to perform the transmission destination selection operation on the display surface 12.

In the command-received apparatus 10 that has received the message from the target other-party apparatus 10, the controller 100 starts the message communication application (for example, the IM application) in the storage 103. In this manner, in the command-received apparatus 10, the phone application and the message communication application are simultaneously executed. Subsequently, the controller 100 of the command-received apparatus 10 causes the display 120 to display the message transmitted from the target other-party apparatus 10.

After this operation, the command-received apparatus 10 and the target other-party apparatus 10 performing the modified phone communication operate in a manner similar to the above, so that voice of the user of the command-received apparatus 10 transmitted from the command-received apparatus 10 is output through the receiver 150 or the speaker 160 of the target other-party apparatus 10, and messages transmitted from the target other-party apparatus 10 are displayed on the command-received apparatus 10.

Figure 11:
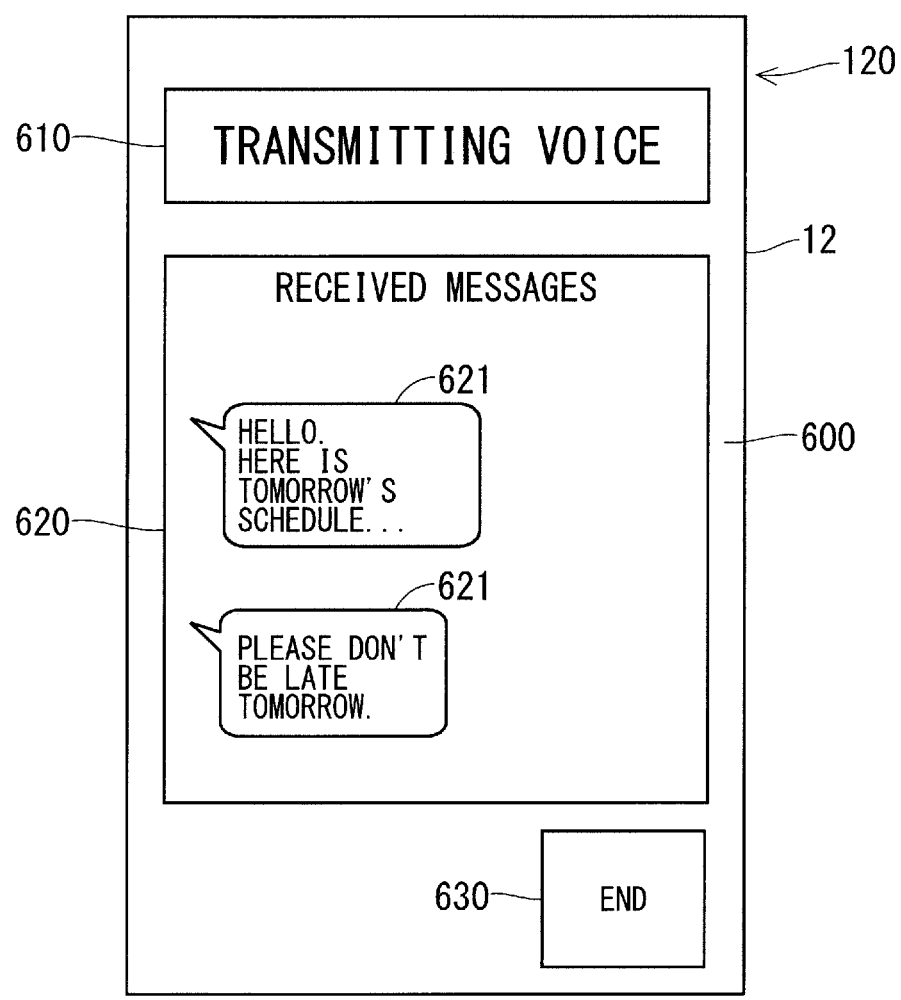
FIG. 11 is a diagram illustrating one example of display of the electronic apparatus.

FIG. 11 is a diagram illustrating one example of a display screen 600 that is displayed by the command-received apparatus 10 performing the modified phone communication. FIG. 12 is a diagram illustrating one example of a display screen 650 that is displayed by the target other-party apparatus 10 performing the modified phone communication.

As illustrated in FIG. 11, the display screen 600 comprises information 610, a received message display screen 620, and an end button 630. The information 610 is information indicating that the command-received apparatus 10 is currently transmitting voice input to the microphone 170 to the target other-party apparatus 10. The received message display screen 620 shows messages 621 that the command-received apparatus 10 receives from the target other-party apparatus 10. The end button 630 is a button for allowing the user of the command-received apparatus 10 to command the command-received apparatus 10 to end the modified phone communication. For example, when the user performs a tap operation on the end button 630, the command-received apparatus 10 ends execution of the phone application and the IM application, so as to end execution of the modified phone communication being performed with the target other-party apparatus 10.

In contrast, the display screen 650 displayed by the target other-party apparatus 10 performing the modified phone communication comprises, as illustrated in FIG. 12, information 660, a message-related screen 670, and an end button 680. The information 660 is information indicating that the target other-party apparatus 10 is currently receiving voice from the command-received apparatus 10 and outputting the received voice through the receiver 150 or the speaker 160. The message-related screen 670 comprises a transmitted message display screen 671, a message bar 673, and a transmit button 674. The transmitted message display screen 671 shows messages 672 that the target other-party apparatus 10 has transmitted to the command-received apparatus 10. The message bar 673 shows a message input by the user, i.e., a message to be transmitted. For example, the target other-party user can input a message to be transmitted to the target other-party apparatus 10 by operating the display surface 12 of the target other-party apparatus 10. For example, when the target other-party user performs a tap operation on the transmit button 674, the target other-party apparatus 10 transmits the input message, i.e., the message shown in the message bar 673, to the command-received apparatus 10. The end button 680 is a button for allowing the target other-party user to command the target other-party apparatus 10 to end the modified phone communication. For example, when the target other-party user performs a tap operation on the end button 680, the target other-party apparatus 10 ends execution of the phone application and the IM application, so as to end execution of the modified phone communication being performed with the command-received apparatus 10.

As described above, in one example, when the command-received apparatus 10 determines that the target other-party user is in a situation where the target other-party user has difficulty in speaking freely based on the apparatus information of the target other-party apparatus 10, the command-received apparatus 10 determines execution of the control processing. This configuration enables the target other-party user to cause the target other-party apparatus 10 to transmit messages to the command-received apparatus 10 while hearing voice of the user of the command-received apparatus 10, when the target other-party user is in a situation where the target other-party user has difficulty in speaking freely. As a result, convenience of the electronic apparatus 10 is enhanced.

Note that the method in which the electronic apparatus 10 determines whether or not the other-party user is in a situation where the other-party user has difficulty in speaking freely based on the apparatus information of the other-party apparatus 10 is not limited to one method described above.

For example, when the electronic apparatus 10 determines that the other-party user is at an art gallery, a museum, or a hospital based on the apparatus information of the other-party apparatus 10, the electronic apparatus 10 may determine that the other-party user is in a situation where the other-party user has difficulty in speaking freely. In this case, the apparatus information of the electronic apparatus 10 includes position information indicating the position of the electronic apparatus 10, for example. As the position information, for example, the position information acquired by the position acquisition unit 140 is used. The controller 100 of the command-received apparatus 10 determines that the other-party user is at an art gallery, a museum, or a hospital, based on the position information included in the apparatus information of the other-party apparatus 10 and the facility information included in the map information 103b in the storage 103. Note that the method in which the electronic apparatus 10 determines that the other-party user is at an art gallery or the like is not limited to one method described above.

Further, the apparatus information of the electronic apparatus 10 may include information indicating that the user of the electronic apparatus 10 is in a situation where the user has difficulty in speaking freely. Also in this case, the electronic apparatus 10 can determine whether or not the other-party user is in a situation where the other-party user has difficulty in speaking freely, based on the apparatus information of the other-party apparatus 10. For example, the user can notify the electronic apparatus 10 that the user is in a situation where the user has difficulty in speaking freely by operating the display surface 12 of the electronic apparatus 10.

Further, when the user of the electronic apparatus 10 is in a state in which the user has difficulty in speaking freely, in some cases it is desirable for the user that a phone ringtone be not output from the electronic apparatus 10. For example, for the user who is in a train and in a situation where the user has difficulty in speaking freely, it may not be desirable that a phone ringtone be output from the electronic apparatus 10.

In view of this, in Step s13 described above, the command-received apparatus 10 may transmit a second control signal to the target other-party apparatus 10 along with the first control signal. The second control signal is a signal for commanding the target other-party apparatus 10 not to give the incoming phone call notification using sound. In this case, when the target other-party apparatus 10 that has received the second control signal receives an outgoing phone call placed by the command-received apparatus 10, the target other-party apparatus 10 does not give the incoming phone call notification using sound, regardless of details of the settings related to the incoming call notification of the subject apparatus. Specifically, the target other-party apparatus 10 does not output a phone ringtone through the speaker 160. This configuration further enhances convenience of the electronic apparatus 10.

Figure 13:
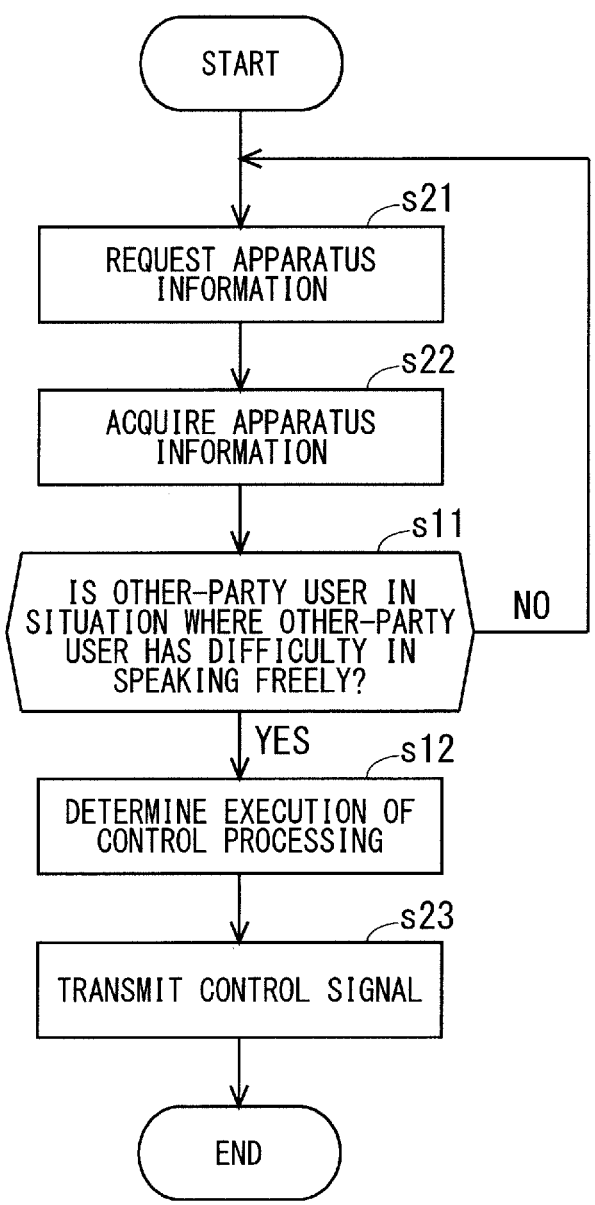
FIG. 13 is a flowchart illustrating one example of operation of the electronic apparatus.

Further, the electronic apparatus 10 may determine execution of the control processing based on the apparatus information of the other-party apparatus 10 while the electronic apparatus 10 performs phone communication with the other-party apparatus 10. FIG. 13 is a flowchart illustrating one example of operation of the electronic apparatus 10 in the above-mentioned case. The electronic apparatus 10 executes first concurrent phone communication processing illustrated in FIG. 13 while the electronic apparatus 10 performs phone communication with the other-party apparatus 10.

When the target electronic apparatus 10 starts phone communication with the other-party apparatus 10, the target electronic apparatus 10 executes Step s21 as illustrated in FIG. 13. In Step s21, the controller 100 of the target electronic apparatus 10 generates the first request signal described above for requesting the server apparatus 50 to transmit apparatus information of the other-party apparatus 10. Then, the controller 100 causes the wireless communication unit 110 to transmit the generated first request signal to the server apparatus 50.

After Step s21, in Step s22, when the target electronic apparatus 10 receives the latest apparatus information of the other-party apparatus 10, Step s11 described above is executed. In Step s11, whether or not the other-party user is in a situation where the other-party user has difficulty in speaking freely is determined based on the apparatus information acquired in Step s22.

If the process proceeds to YES in Step s11, Step s12 described above is executed. Subsequently, in Step s23, the controller 100 generates the first control signal described above. Then, the controller 100 causes the wireless communication unit 110 to transmit the generated first control signal to the other-party apparatus 10. When the other-party apparatus 10 performs operation according to the first control signal received from the target electronic apparatus 10, the modified phone communication is performed between the other-party apparatus 10 and the target electronic apparatus 10. After Step s23, the first concurrent phone communication processing ends.

In contrast, if the process proceeds to NO in Step s11, Step s21 is executed again. After Step s21, the target electronic apparatus 10 operates in a manner similar to the above. When the phone communication with the other-party apparatus 10 ends while the first concurrent phone communication processing is executed, the target electronic apparatus 10 ends the first concurrent phone communication processing even if the process does not proceed to YES in Step s11.

Second Example

In the first example described above, the target electronic apparatus 10 determines execution of the control processing, based on the apparatus information of the other-party apparatus 10. In one example described below, by contrast, the target electronic apparatus 10 executes the control processing when the subject apparatus user selects execution of the control processing.

FIG. 14 is a flowchart illustrating Step s4 according to one example. In Step s4 according to one example, the command-received apparatus 10 determines execution of selection notification processing, based on the apparatus information of the target other-party apparatus 10. The selection notification processing is processing in which the command-received apparatus 10 causes a notification unit to give a notification suggesting that the user make a selection as to whether or not the command-received apparatus 10 performs the control processing. This configuration enhances convenience of the electronic apparatus 10.

As illustrated in FIG. 14, Step s11 described above is executed. If the process proceeds to NO in Step s11, Step s14 described above is executed. In contrast, if the process proceeds to YES in Step s11, in Step s31, the controller 100 of the command-received apparatus 10 determines execution of the selection notification processing. Subsequently, in Step s32, the controller 100 executes the selection notification processing of causing a notification unit to give a notification suggesting that the user make a selection as to whether or not the command-received apparatus 10 performs the control processing. As the notification unit used in the selection notification processing, for example, the display 120 is adopted. In this case, the controller 100 causes the display 120 to display a selection screen 700 for allowing the user to make a selection as to whether or not the command-received apparatus 10 performs the control processing.

Figure 15:
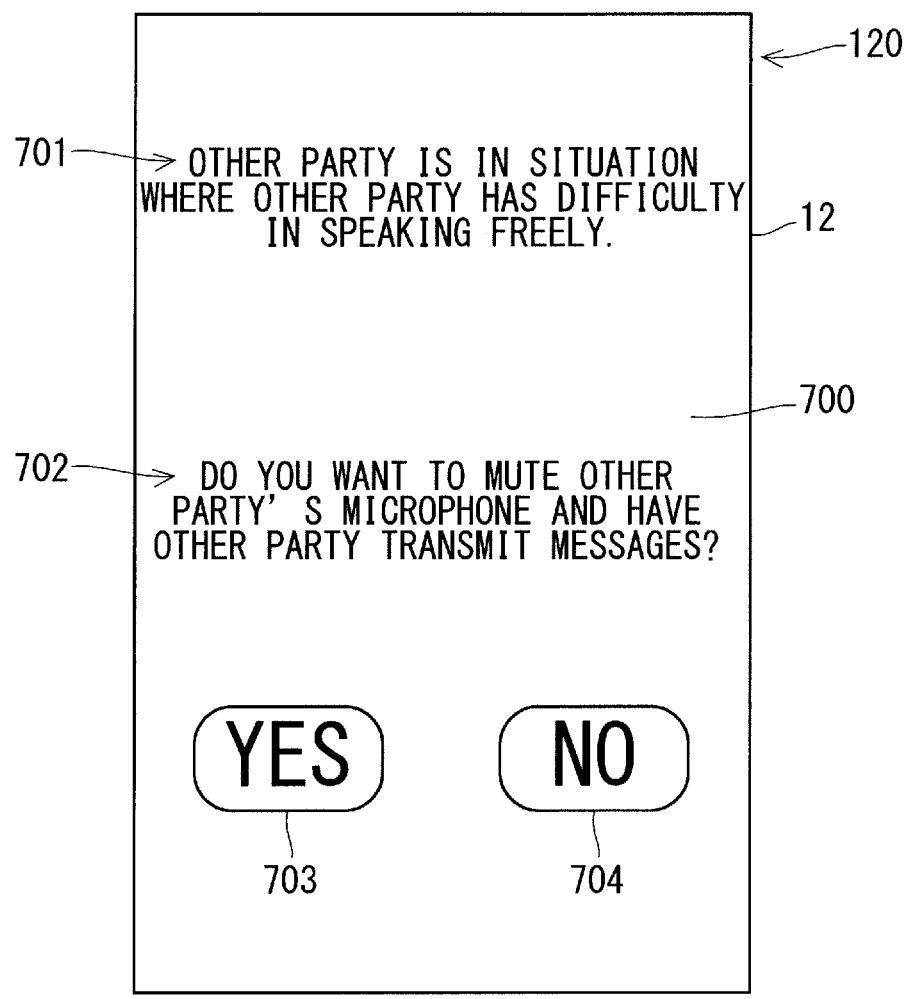
FIG. 15 is a diagram illustrating one example of display of the electronic apparatus.

FIG. 15 is a diagram illustrating one example of the selection screen 700. As illustrated in FIG. 15, the selection screen 700 comprises pieces of information 701 and 702 and select buttons 703 and 704. The information 701 is information indicating that the target other-party user is in a situation where the target other-party user has difficulty in speaking freely. The information 702 is information for asking the user to make a selection as to whether or not the command-received apparatus 10 performs the control processing. The select button 703 is a button to be operated when the user makes a selection that the command-received apparatus 10 executes the control processing. In other words, the select button 703 is a button to be operated when the user selects execution of the control processing. The select button 704 is a button to be operated when the user makes a selection that the command-received apparatus 10 does not perform the control processing. In other words, the select button 704 is a button to be operated when the user selects non-execution of the control processing. The user can notify the electronic apparatus 10 that the user has selected execution of the control processing by performing a tap operation on the select button 703, for example. Alternatively, the user can notify the electronic apparatus 10 that the user has selected non-execution of the control processing by performing a tap operation on the select button 704, for example. Note that the information 701 need not necessarily be shown on the selection screen 700.

After the selection screen 700 is displayed in Step s32, in Step s33, the controller 100 judges whether the subject apparatus user has selected execution of the control processing or has selected non-execution of the control processing, based on detection results obtained from the touch panel 130. If the touch panel 130 detects an operation performed on the select button 703, the controller 100 judges that the subject apparatus user has selected execution of the control processing. In contrast, if the touch panel 130 detects an operation performed on the select button 704, the controller 100 judges that the subject apparatus user has selected non-execution of the control processing.

In Step s33, if it is judged that execution of the control processing has been selected, Step s13 described above is executed. In contrast, in Step s33, if it is judged that non-execution of the control processing has been selected, Step s14 described above is executed.

Note that the notification unit used in the selection notification processing need not necessarily be the display 120. For example, the speaker 160 may output voice for suggesting the user make a selection as to whether or not the command-received apparatus 10 performs the control processing. Alternatively, the user may be notified to make a selection as to whether or not the command-received apparatus 10 performs the control processing by the vibrator 230 vibrating the apparatus case 11 in a specific vibration pattern. Alternatively, at least two of the display 120, the speaker 160, and the vibrator 230 may notify the user to make a selection as to whether or not the command-received apparatus 10 performs the control processing. When at least one of the speaker 160 and the vibrator 230 notifies the user to make a selection as to whether or not the command-received apparatus 10 performs the control processing, the user can select execution of the control processing or select non-execution of the control processing by performing a predetermined operation on the display surface 12.

As can be understood from the description above, one example described above also enables the target other-party user to cause the target other-party apparatus 10 to transmit messages to the command-received apparatus 10 while hearing voice of the user of the command-received apparatus 10, when the target other-party user is in a situation where the target other-party user has difficulty in speaking freely. As a result, convenience of the electronic apparatus 10 is enhanced.

Note that, similarly to the first example, in Step s13 of FIG. 14, the command-received apparatus 10 may transmit the second control signal for commanding the target other-party apparatus 10 not to give the incoming phone call notification using sound to the target other-party apparatus 10, along with the first control signal. With this configuration, when the target other-party apparatus 10 that has received the second control signal receives an outgoing phone call placed by the command-received apparatus 10, the target other-party apparatus 10 does not give the incoming phone call notification using sound, regardless of details of the settings related to the incoming call notification of the subject apparatus. This configuration further enhances convenience of the electronic apparatus 10.

Figure 16:
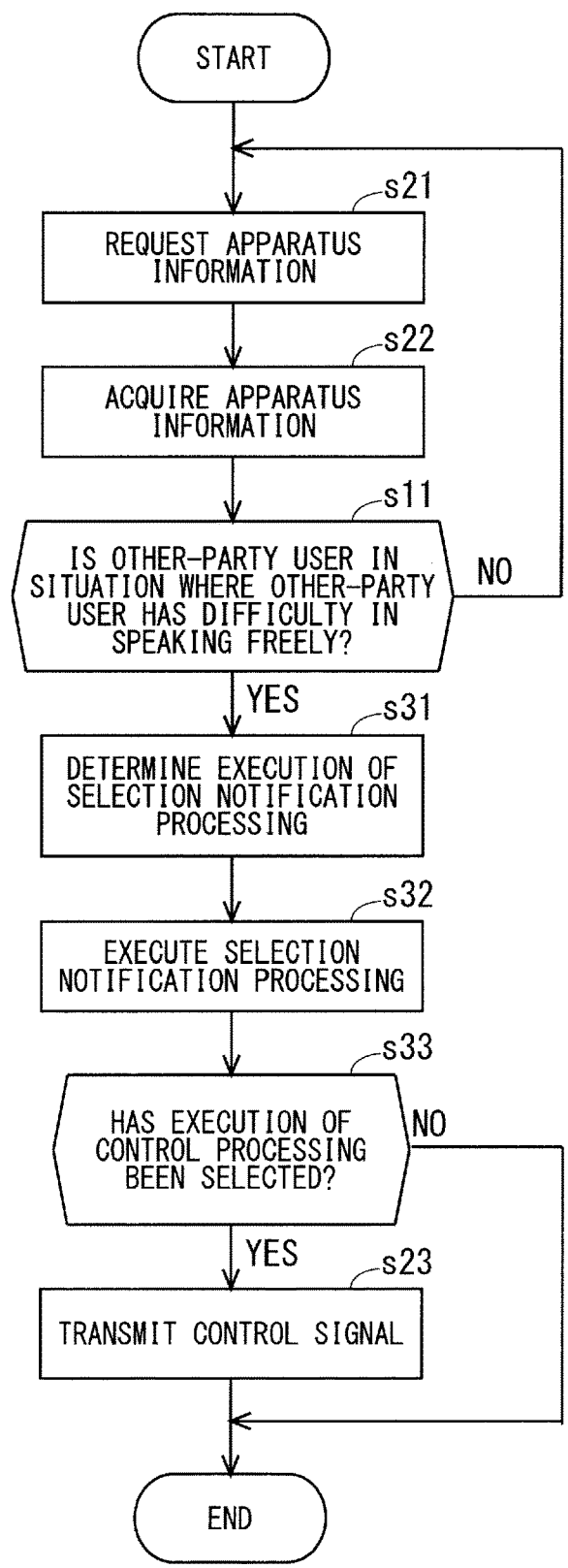
FIG. 16 is a flowchart illustrating one example of operation of the electronic apparatus.

Further, the target electronic apparatus 10 may determine execution of the selection notification processing based on the apparatus information of the other-party apparatus 10 while the target electronic apparatus 10 performs phone communication with the other-party apparatus 10. FIG. 16 is a flowchart illustrating one example of operation of the target electronic apparatus 10 in the above-mentioned case. The target electronic apparatus 10 executes second concurrent phone communication processing illustrated in FIG. 16 while the target electronic apparatus 10 performs phone communication with the other-party apparatus 10.

When the target electronic apparatus 10 starts phone communication with the other-party apparatus 10, as illustrated in FIG. 16, the target electronic apparatus 10 executes Step s21 described above. After Step s21, when Step s22 described above is executed, Step s11 described above is executed.

If the process proceeds to YES in Step s11, Steps s31 to s33 described above are executed. If the process proceeds to YES in Step s33, Step s23 described above is executed. In this manner, the modified phone communication is started between the other-party apparatus 10 and the target electronic apparatus 10. When Step s23 is executed, the second concurrent phone communication processing ends. Alternatively, if the process proceeds to NO in Step s33, the second concurrent phone communication processing ends.

If the process proceeds to NO in Step s11, Step s21 is executed again. After Step s21, the target electronic apparatus 10 operates in a manner similar to the above. When the phone communication with the other-party apparatus 10 ends while the second concurrent phone communication processing is executed, the target electronic apparatus 10 ends the second concurrent phone communication processing even if the process does not proceed to YES in Step s11.

Third Example

In one example, the target electronic apparatus 10 and the other-party apparatus 10 can communicate with each other with voice/message converted communication, in which voice that is input to the microphone 170 of the target electronic apparatus 10 is converted into a message and the message is displayed on the other-party apparatus 10. In other words, the target electronic apparatus 10 and the other-party apparatus 10 can communicate with each other with voice/message converted communication, in which a voice signal that is output from the microphone 170 of the target electronic apparatus 10 is converted into a message and the message is displayed on the other-party apparatus 10. Further, in one example, the apparatus information of the electronic apparatus 10 includes position information indicating the position of the electronic apparatus 10. As the position information, for example, the position information acquired by the position acquisition unit 140 is adopted. The position information of the electronic apparatus 10 may be hereinafter referred to as "apparatus position information".

Figure 17:
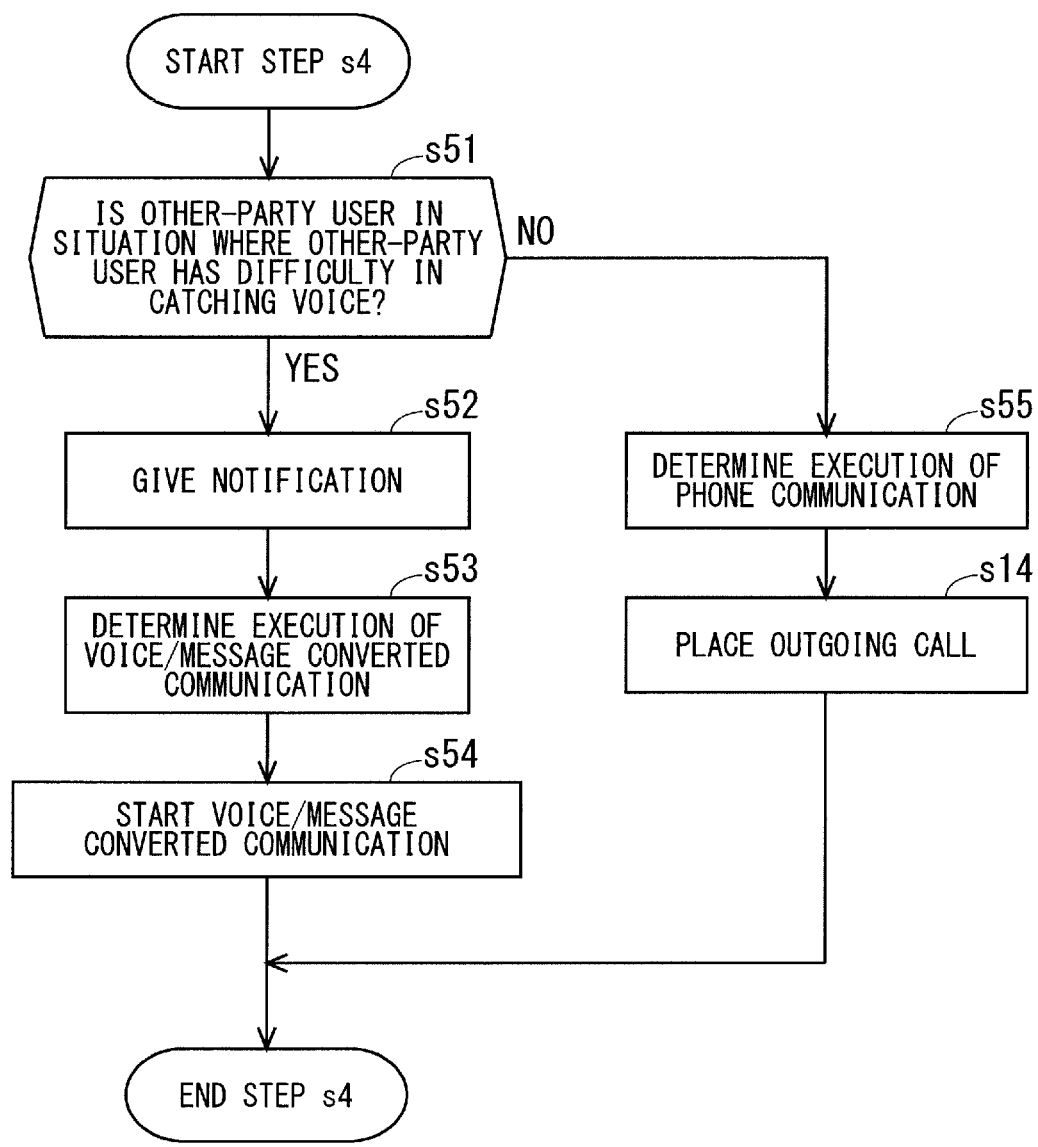
FIG. 17 is a flowchart illustrating one example of operation of the electronic apparatus.

FIG. 17 is a flowchart illustrating Step s4 according to one example. In Step s4 according to one example, the command-received apparatus 10 determines execution of the voice/message converted communication, based on the apparatus information of the target other-party apparatus 10. This configuration enhances convenience of the electronic apparatus 10.

As illustrated in FIG. 17, in Step s51, the controller 100 of the command-received apparatus 10 determines whether or not the target other-party user is in a situation where the target other-party user has difficulty in catching voice output from the target other-party apparatus 10, based on the apparatus information of the target other-party apparatus 10. Specifically, the controller 100 determines whether or not the target other-party user is in a situation where the target other-party user has difficulty in catching voice output through the receiver 150 or the speaker 160 of the target other-party apparatus 10, based on the apparatus information of the target other-party apparatus 10. The situation where the user has difficulty in catching voice output from the electronic apparatus 10 may be hereinafter referred to as a situation where the user has difficulty in catching voice.

Here, in one example, the storage 103 stores noisy place information indicating noisy places, which are places that are likely to generate a loud noise. The noisy place information includes position information of such noisy places. Examples of the noisy places indicated by the noisy place information include a factory, a place alongside a major road, etc. The noisy places indicated by the noisy place information may further include noisy places specified by the user. In this case, the user inputs position information of noisy places to the electronic apparatus 10 by operating the display surface 12, for example. For example, the user may input position information of a construction site of which construction work is carried out by a company that the user works for to the electronic apparatus 10. The electronic apparatus 10 includes the position information input by the user in the noisy place information in the storage 103. In this manner, the noisy places specified by the user are included in the noisy places indicated by the noisy place information.

In Step s51, the controller 100 determines whether or not the target other-party user is in a situation where the target other-party user has difficulty in catching voice, based on the apparatus position information included in the apparatus information of the target other-party apparatus 10 and the noisy place information in the storage 103. Specifically, the controller 100 determines whether or not a place where the target other-party user is present is a noisy place, based on the apparatus position information and the noisy place information. If the position indicated by the apparatus position information is included in one of the noisy places indicated by the noisy place information, the controller 100 determines that the place where the target other-party user is present is a noisy place. In contrast, if the position indicated by the apparatus position information is not included in any of the noisy places indicated by the noisy place information, the controller 100 determines that the place where the target other-party user is present is not a noisy place.

If the controller 100 determines that the place where the target other-party user is present is a noisy place, the controller 100 determines that the target other-party user is in a situation where the target other-party user has difficulty in catching voice. In contrast, if the controller 100 determines that the place where the target other-party user is present is not a noisy place, the controller 100 determines that the target other-party user is not in a situation where the target other-party user has difficulty in catching voice.

If the process proceeds to NO in Step s51, in Step s55, the controller 100 determines execution of the phone communication. Subsequently, Step s14 described above is executed.

Figure 18:
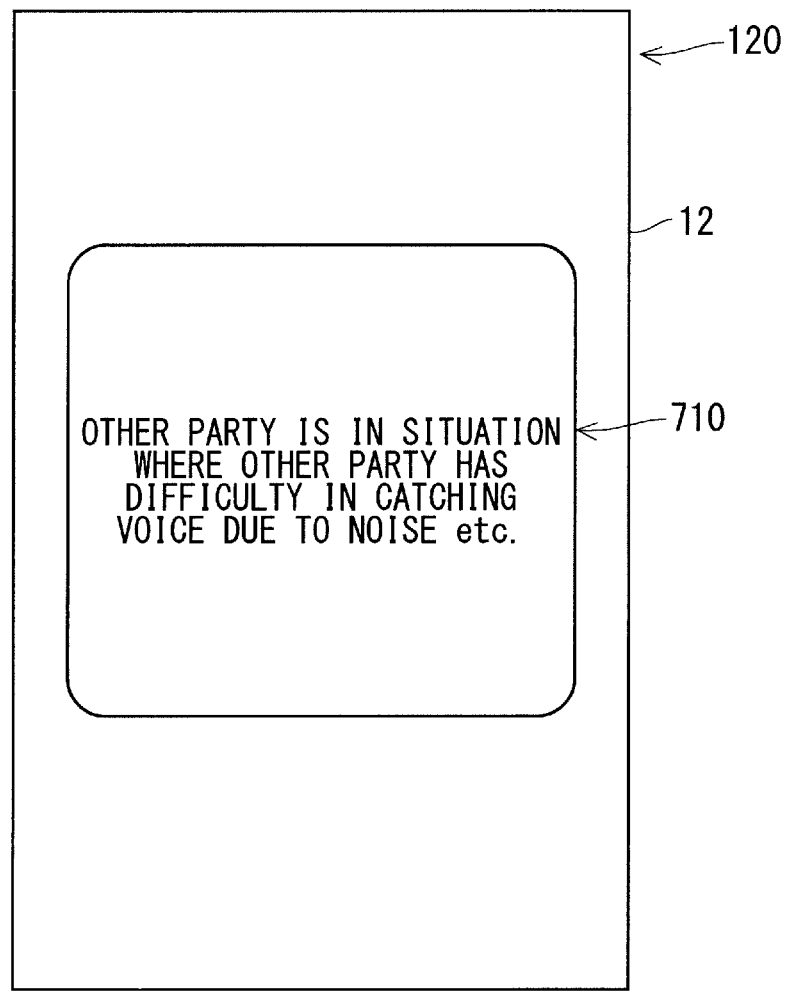
FIG. 18 is a diagram illustrating one example of display of the electronic apparatus.

In contrast, if the process proceeds to YES in Step s51, Step s52 is executed. In Step s52, the controller 100 causes a notification unit to give a notification indicating that the target other-party user is in a situation where the target other-party user has difficulty in catching voice. As the notification unit, for example, the display 120 is adopted. In this case, the controller 100 causes the display 120 to display information 710 indicating that the target other-party user is in a situation where the target other-party user has difficulty in catching voice. FIG. 18 is a diagram illustrating a display example of the information 710. Note that the controller 100 may cause a notification unit other than the display 120 to give a notification indicating that the target other-party user is in a situation where the target other-party user has difficulty in catching voice.

After the information 710 is displayed for a certain period of time in Step s52, Step s53 is executed. In Step s53, the controller 100 determines execution of the voice/message converted communication. Then, in Step s54, the command-received apparatus 10 starts the voice/message converted communication with the target other-party apparatus 10.

In one example, in the voice/message converted communication performed between the target electronic apparatus 10 and the other-party apparatus 10, messages transmitted from the other-party apparatus 10 are converted into voice, and the voice is received in the target electronic apparatus 10 so as to be output through the receiver 150 or the speaker 160 of the target electronic apparatus 10. In other words, in the voice/message converted communication performed between the target electronic apparatus 10 and the other-party apparatus 10, messages generated by the other-party apparatus 10 are converted into a voice signal, and the voice signal is received in the target electronic apparatus 10 so as to be input to the receiver 150 or the speaker 160 of the target electronic apparatus 10.

Figure 19:
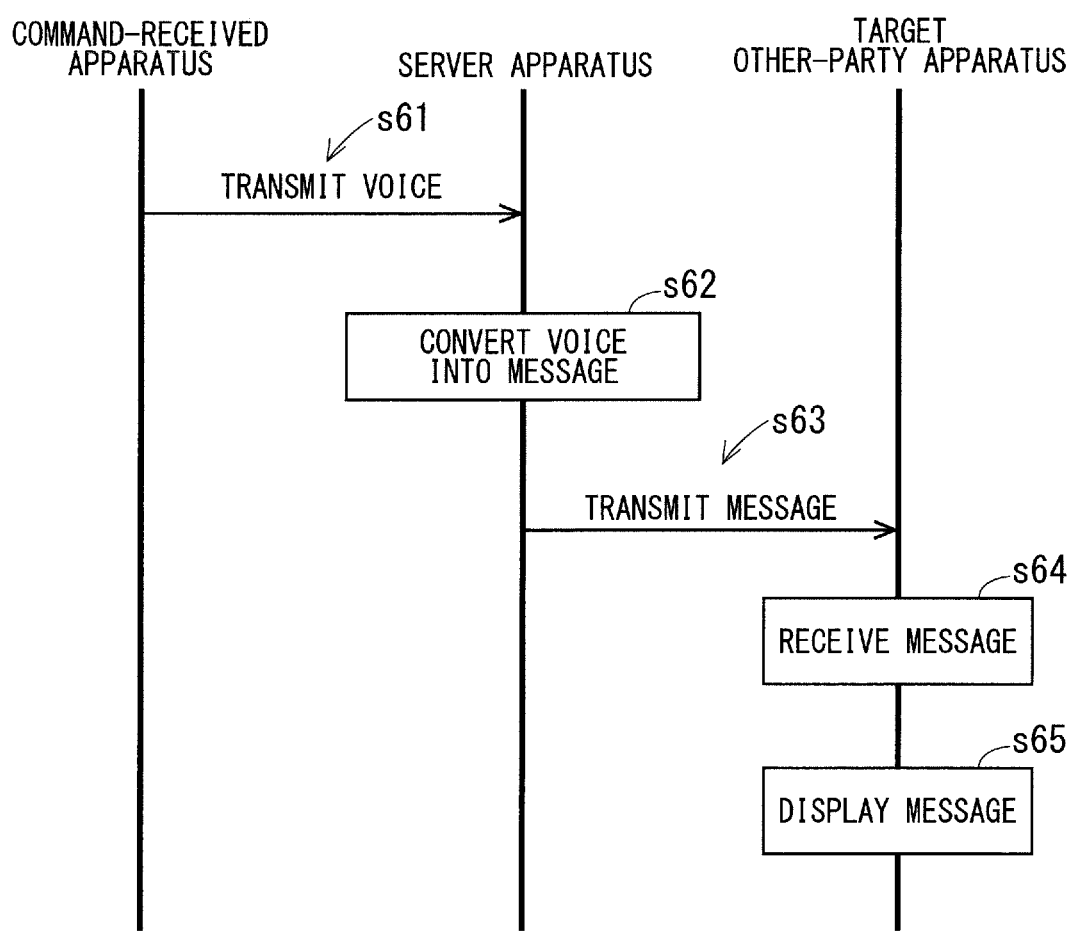
FIG. 19 is a diagram illustrating one example of operation of the processing system.
Figure 20:
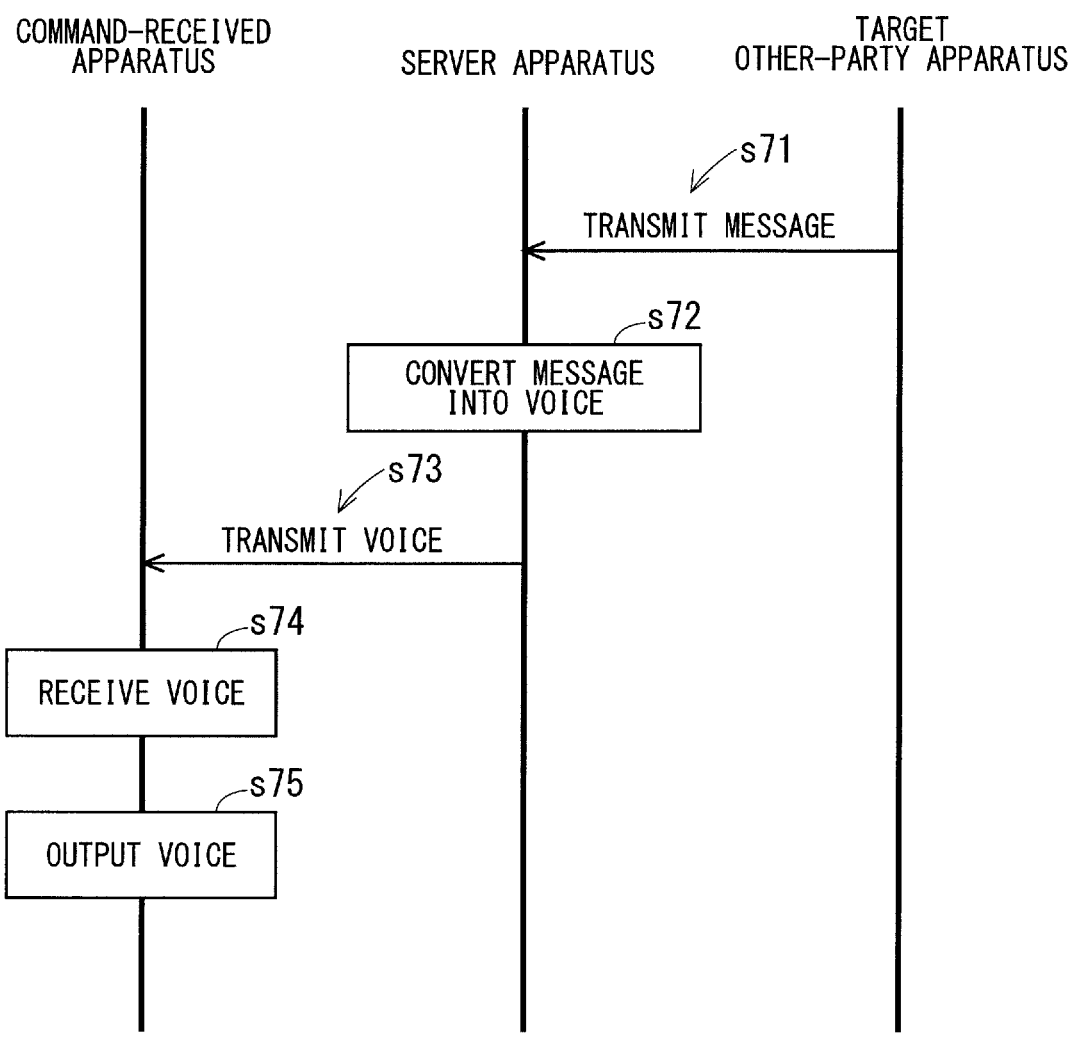
FIG. 20 is a diagram illustrating one example of operation of the processing system.

FIG. 19 and FIG. 20 are each a diagram for describing the voice/message converted communication performed between the command-received apparatus 10 and the target other-party apparatus 10. The command-received apparatus 10 and the target other-party apparatus 10 perform the voice/message converted communication via the server apparatus 50, for example.

In Step s53, when execution of the voice/message converted communication is determined, as illustrated in FIG. 19, in Step s61, the command-received apparatus 10 executing the phone application transmits voice input to the microphone 170 of the subject apparatus to the server apparatus 50. Specifically, the controller 100 of the command-received apparatus 10 causes the wireless communication unit 110 to transmit a voice signal output from the microphone 170 to the server apparatus 50. In this case, the controller 100 also causes the wireless communication unit 110 to transmit a first conversion command signal to the server apparatus 50. The first conversion command signal is a signal for commanding the server apparatus 50 to convert voice to be transmitted to the target other-party apparatus 10 from the command-received apparatus 10 into a message for the message communication application. The voice transmitted from the command-received apparatus 10 is, for example, converted into a message for the IM application.

In the server apparatus 50 that has received the voice signal and the first conversion command signal from the command-received apparatus 10, in Step s62, the controller 51 converts voice represented by the received voice signal into a message for the IM application according to the first conversion command signal. Specifically, the controller 51 transcribes the voice represented by the voice signal from the command-received apparatus 10 into text, and converts the transcribed text into a message. Subsequently, in Step s63, the controller 51 causes the communication unit 54 to transmit the generated message to the target other-party apparatus 10.

When the target other-party apparatus 10 receives the message from the server apparatus 50 in Step s64, in Step s65, the target other-party apparatus 10 causes the display 120 to display the received message. In Step s65, the controller 100 of the target other-party apparatus 10 starts the IM application in the storage 103. Then, the controller 100 causes the display 120 to display the message from the server apparatus 50. For example, if the voice transmitted by the command-received apparatus 10 is voice uttered by a person when the person reads text "hello", the text "hello" is displayed on the display 120 as a message.

When voice is input to the command-received apparatus 10 afterwards, Steps s61 to s65 are executed, such that the voice input to the microphone 170 of the command-received apparatus 10 is converted into a message. Then, the message obtained through the conversion is displayed on the target other-party apparatus 10.

In contrast, in the target other-party apparatus 10 performing the voice/message converted communication, as illustrated in FIG. 20, in Step s71, the controller 100 executing the IM application causes the wireless communication unit 110 to transmit a message addressed to the command-received apparatus 10 that is input by the target other-party user (i.e., a message addressed to the command-received apparatus 10 that is generated by the controller 100 in response to input operation of the target other-party user) to the server apparatus 50. In this case, the controller 100 also causes the wireless communication unit 110 to transmit a second conversion command signal to the server apparatus 50. The second conversion command signal is a signal for commanding the server apparatus 50 to convert a message addressed to the command-received apparatus 10 transmitted from the target other-party apparatus 10 into voice.

In the server apparatus 50 that has received the message and the second conversion command signal from the target other-party apparatus 10, in Step s72, the controller 51 converts the received message into voice according to the second conversion command signal. Specifically, the controller 51 converts the message from the target other-party apparatus 10 into a voice signal that represents voice that may be uttered by a person when the person reads the message. Such voice is also referred to as synthetic voice.

After Step s72, in Step s73, the controller 51 causes the communication unit 54 to transmit a voice signal representing the generated voice (i.e., the synthetic voice) to the command-received apparatus 10. For example, if the message transmitted by the target other-party apparatus 10 is text "thank you", in Step s72, a voice signal representing voice that may be uttered by a person when the person reads the text "thank you" is generated.

When the command-received apparatus 10 receives the voice signal from the server apparatus 50 in Step s74, in Step s75, the command-received apparatus 10 externally outputs voice represented by the received voice signal. In Step s75, the controller 100 inputs the voice signal from the server apparatus 50 to the receiver 150, for example. The receiver 150 converts the input voice signal into voice, and outputs the voice.

When a message is transmitted from the target other-party apparatus 10 afterwards, Steps s71 to s75 are executed, such that the message transmitted from the target other-party apparatus 10 is converted into voice. Then, the voice obtained through the conversion is output from the command-received apparatus 10.

Figure 21:
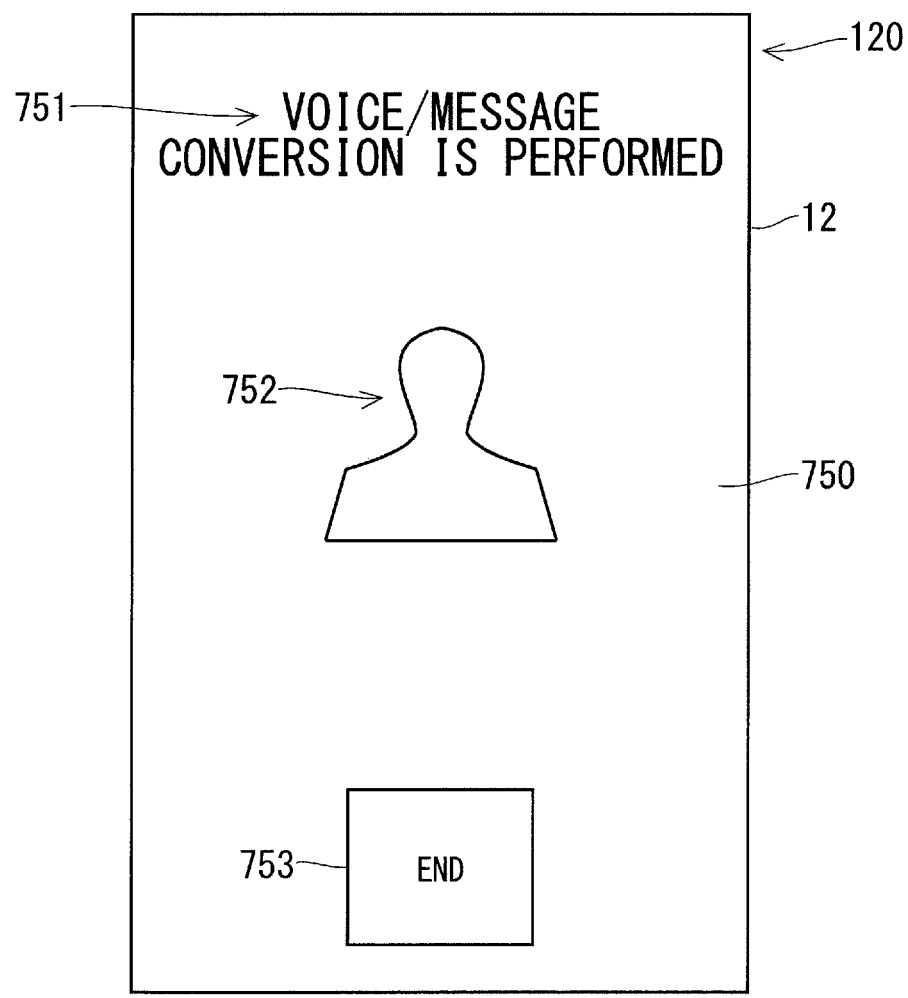
FIG. 21 is a diagram illustrating one example of display of the electronic apparatus.

FIG. 21 is a diagram illustrating one example of a display screen 750 that is displayed by the command-received apparatus 10 performing the voice/message converted communication. As illustrated in FIG. 21, the display screen 750 comprises information 751, an image 752, and an end button 753. The information 751 is information indicating that the command-received apparatus 10 is currently performing the voice/message converted communication. The image 752 is an image included in information related to the target other-party apparatus 10, which is included in the address book in the storage 103. The end button 753 is a button for allowing the user of the command-received apparatus 10 to command the command-received apparatus 10 to end the voice/message converted communication. For example, when the user of the command-received apparatus 10 performs a tap operation on the end button 753, the command-received apparatus 10 ends execution of the phone application, so as to end execution of the voice/message converted communication being performed with the target other-party apparatus 10.

Figure 22:
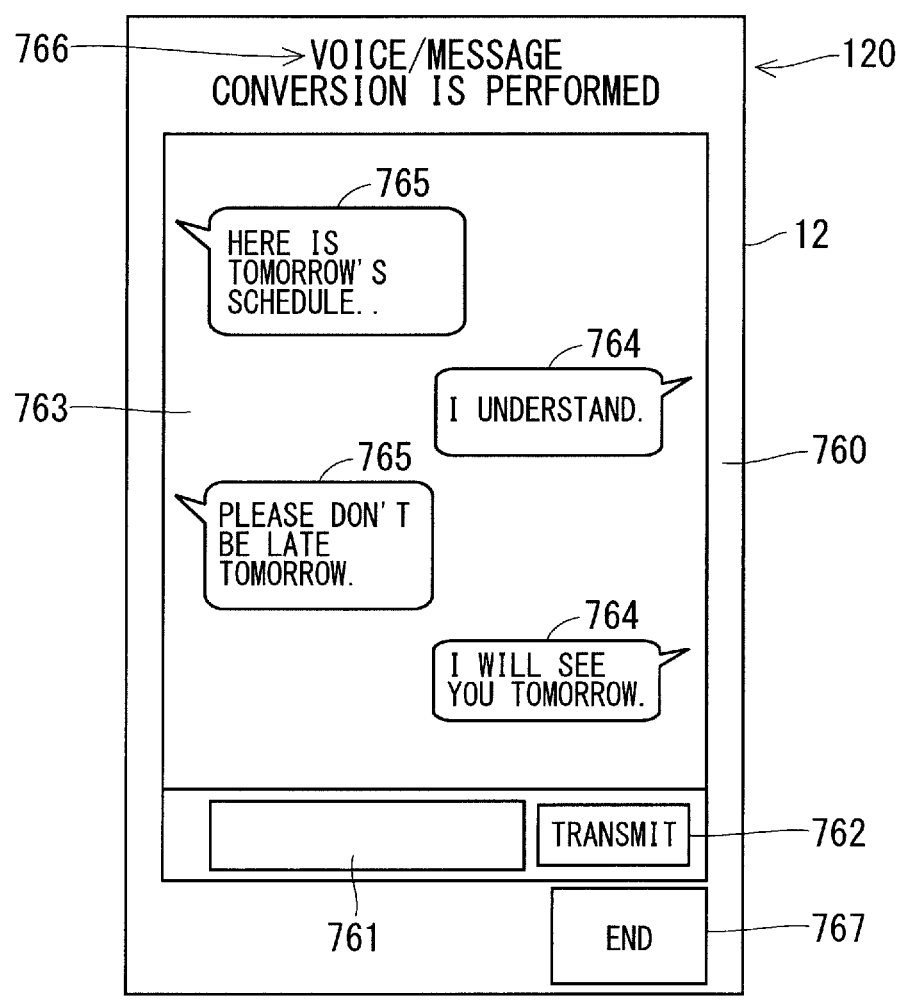
FIG. 22 is a diagram illustrating one example of display of the electronic apparatus.

FIG. 22 is a diagram illustrating one example of a display screen 760 that is displayed by the target other-party apparatus 10 performing the voice/message converted communication. The display screen 760 is a transmitted/received message display screen that shows messages previously transmitted by the target other-party apparatus 10 and messages previously received by the target other-party apparatus 10, and is also a create message screen for allowing the target other-party user to create a message.

As illustrated in FIG. 22, the display screen 760 comprises a message bar 761, a transmit button 762, and a history screen 763. The display screen 760 further comprises information 766 and an end button 767.

The history screen 763 shows transmitted messages 764 previously transmitted by the target other-party apparatus 10, and received messages 765 previously received by the target other-party apparatus 10. Each received message 765 is a message showing the details of voice transmitted from the command-received apparatus 10, that is, a message obtained through a process in which the server apparatus 50 converts the voice into the message. The message bar 761 shows a message to be transmitted, i.e., a message input by the user. The target other-party user can input the message to be transmitted to the electronic apparatus 10 by operating the display surface 12 displaying the display screen 760. For example, when a tap operation is performed on the transmit button 762, the target electronic apparatus 10 transmits the input message, i.e., the message shown in the message bar 761.

The information 766 is information indicating that the target other-party apparatus 10 is currently performing the voice/message converted communication. The end button 767 is a button for allowing the target other-party user to command the target other-party apparatus 10 to end the voice/message converted communication. For example, when the target other-party user performs a tap operation on the end button 767, the target other-party apparatus 10 ends execution of the IM application, so as to end execution of the voice/message converted communication being performed with the command-received apparatus 10.

As can be understood from the description above, the user of the command-received apparatus 10 can use the command-received apparatus 10 in a similar manner, whether the command-received apparatus 10 performs the phone communication or the voice/message converted communication with the target other-party apparatus 10. Further, the user of the target other-party apparatus 10 can also use the target other-party apparatus 10 in a similar manner, whether the target other-party apparatus 10 performs the message communication or the voice/message converted communication with the command-received apparatus 10.

As described above, in one example, when the command-received apparatus 10 determines that the target other-party user is in a situation where the target other-party user has difficulty in catching voice based on the apparatus information of the target other-party apparatus 10, the command-received apparatus 10 determines execution of the voice/message converted communication. With this configuration, when the target other-party user has difficulty in catching voice output through the receiver 150 or the speaker 160, the target other-party user can check the details of the voice from the command-received apparatus 10 by seeing messages displayed on the command-received apparatus 10. Consequently, the target other-party user can appropriately communicate with the user of the command-received apparatus 10. As a result, convenience of the electronic apparatus 10 is enhanced.

Note that, in Step s72 described above, when the server apparatus 50 converts the message received from the target electronic apparatus 10 into synthetic voice, the server apparatus 50 may generate the synthetic voice, based on voice that is registered in the address book stored in the target other-party apparatus 10. In this case, in Step s71, the target electronic apparatus 10 transmits information related to the target other-party apparatus 10 itself included in the address book in the storage 103 to the server apparatus 50, along with the message and the second conversion command signal. The information related to the target other-party apparatus 10 itself included in the address information in the storage 103 of the target other-party apparatus 10 may be hereinafter referred to as "address registered information related to the target other-party apparatus 10".

The address registered information related to the target other-party apparatus 10 includes, for example, a voice signal representing voice of the user of the target other-party apparatus 10. In the server apparatus 50 that has received the address registered information related to the target other-party apparatus 10, the controller 51 uses a voice signal included in the address registered information when the controller 51 converts the message from the target other-party apparatus 10 into synthetic voice. Specifically, the controller 51 generates synthetic voice corresponding to the message from the target other-party apparatus 10 by using voice of the target other-party user that is represented by the voice signal included in the address registered information related to the target other-party apparatus 10. With this configuration, the user of the command-received apparatus 10 can hear the voice output through the receiver 150 or the like of the command-received apparatus 10 as if the user is having a conversation with the target other-party user. As a result, convenience of the electronic apparatus 10 is enhanced.

Figure 23:
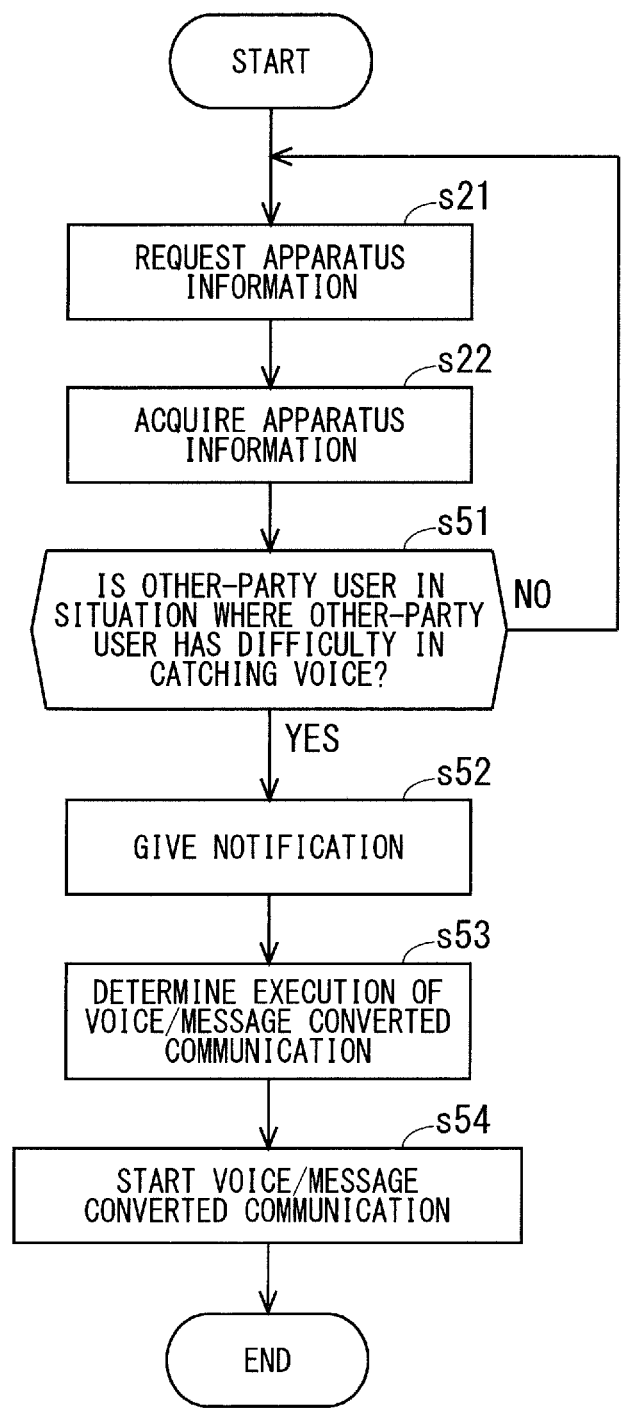
FIG. 23 is a flowchart illustrating one example of operation of the electronic apparatus.

Further, while the target electronic apparatus 10 performs the phone communication with the other-party apparatus 10, the target electronic apparatus 10 may determine whether or not the other-party user is in a situation where the other-party user has difficulty in catching voice, based on the apparatus information of the other-party apparatus 10. FIG. 23 is a flowchart illustrating one example of operation of the electronic apparatus 10 in the above-mentioned case. The electronic apparatus 10 executes third concurrent phone communication processing illustrated in FIG. 23 while the electronic apparatus 10 performs phone communication with the other-party apparatus 10.

The target electronic apparatus 10 executes Step s21 described above as illustrated in FIG. 23 when the target electronic apparatus 10 starts phone communication with the other-party apparatus 10. After Step s21, when Step s22 described above is executed, Step s51 described above is executed.

If the process proceeds to YES in Step s51, Steps s52 to s54 described above are executed. In this manner, the voice/message converted communication is started between the target other-party apparatus 10 and the other-party apparatus 10. In the voice/message converted communication, voice input to the microphone 170 of the target electronic apparatus 10 that has determined the execution of the voice/message converted communication is converted into a message, and the message is displayed on the other-party apparatus 10. Further, a message transmitted by the other-party apparatus 10 is converted into voice, and the voice is received in the target electronic apparatus 10 so as to be output through the receiver 150 or the speaker 160 of the target electronic apparatus 10. After Step s54, the third concurrent phone communication processing ends.

If the process proceeds to NO in Step s51, Step s21 is executed again. After Step s21, the target electronic apparatus 10 operates in a manner similar to the above. When the phone communication with the other-party apparatus 10 ends while the third concurrent phone communication processing is executed, the target electronic apparatus 10 ends the third concurrent phone communication processing even if the process does not proceed to YES in Step s51.

Figure 24:
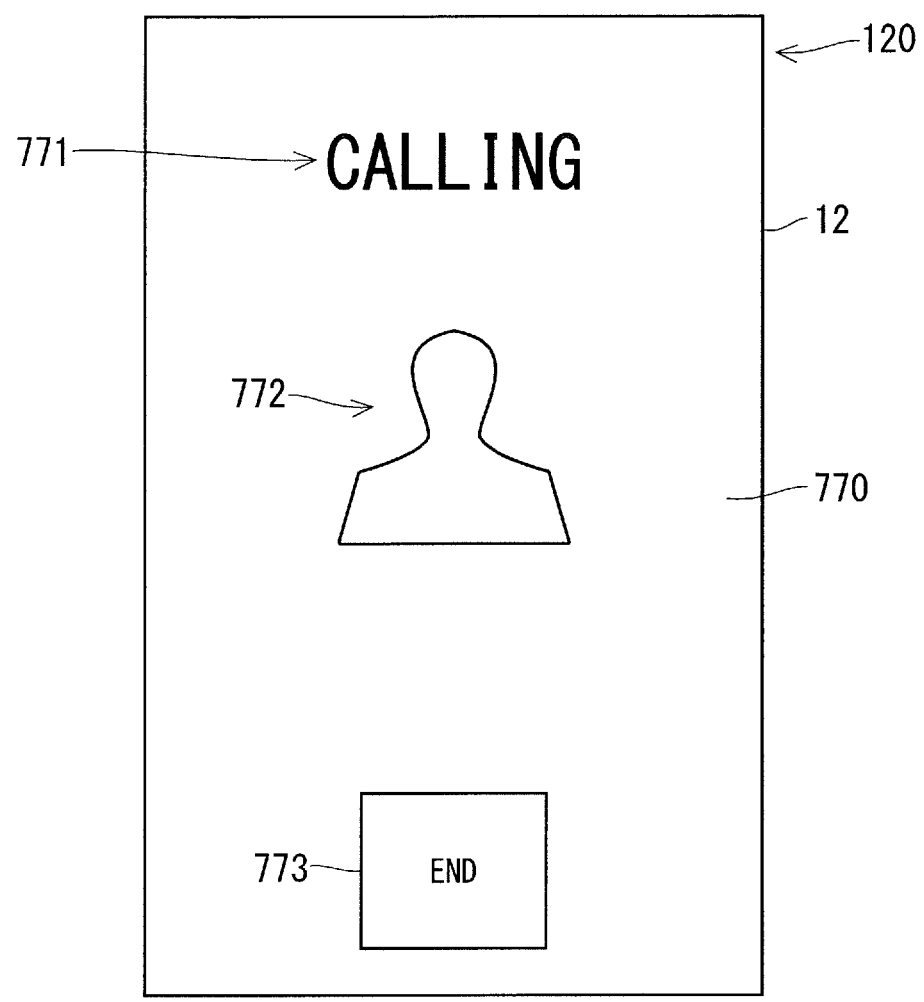
FIG. 24 is a diagram illustrating one example of display of the electronic apparatus.

FIG. 24 is a diagram illustrating one example of a display screen 770 that is displayed by the target other-party apparatus 10 performing the phone communication with the other-party apparatus 10. As illustrated in FIG. 24, the display screen 770 comprises information 771, an image 772, and an end button 773. The information 771 is information indicating that the target other-party apparatus 10 is currently performing the phone communication. The image 772 is an image included in information related to the other-party apparatus 10, which is included in the address book in the storage 103. The end button 773 is a button for allowing the user of the target electronic apparatus 10 to command the target electronic apparatus 10 to end the phone communication. For example, when the user of the target electronic apparatus 10 performs a tap operation on the end button 773, the target electronic apparatus 10 ends execution of the phone application so as to end execution of the phone communication with the other-party apparatus 10. Note that a display screen similar to the display screen 770 is also displayed on the other-party apparatus 10 performing the phone communication.

When the voice/message converted communication is started between the target electronic apparatus 10 and the other-party apparatus 10 through execution of Step s54, the target electronic apparatus 10 displays the display screen 750 illustrated in FIG. 21 described above instead of the display screen 770. In contrast, the other-party apparatus 10 displays the display screen 760 illustrated in FIG. 22 described above instead of a display screen similar to the display screen 770.

Note that, when the voice/message converted communication is executed subsequently to the phone communication between the target electronic apparatus 10 and the other-party apparatus 10 as in the case of one example of FIG. 23, in Step s72 described above, the server apparatus 50 may generate a synthetic signal corresponding to a message from the other-party apparatus 10, based on voice transmitted from the other-party apparatus 10 to the target electronic apparatus 10 in the phone communication (i.e., voice input to the microphone 170 of the other-party apparatus 10). In this case, the other-party apparatus 10 performing the phone communication with the target electronic apparatus 10 transmits the voice input to the microphone 170 to the server apparatus 50, as well as to the target electronic apparatus 10. The server apparatus 50 temporarily stores the voice from the other-party apparatus 10 (specifically, a voice signal) in the storage 53. When the communication between the target electronic apparatus 10 and the other-party apparatus 10 switches from the phone communication to the voice/message converted communication, in Step s72, the controller 51 of the server apparatus 50 converts the message from the other-party apparatus 10 into voice by using the voice of the other-party apparatus 10 in the storage 53. Specifically, the controller 51 generates synthetic voice corresponding to the message from the other-party apparatus 10, based on the voice of the other-party apparatus 10 in the storage 53.

Further, in the voice/message converted communication performed between the target electronic apparatus 10 that has determined the execution of the voice/message converted communication based on the apparatus information of the other-party apparatus 10 and the other-party apparatus 10, the message transmitted by the other-party apparatus 10 may be received in the target electronic apparatus 10 without being converted into voice and the target electronic apparatus 10 may display the received message, unlike the processing illustrated in FIG. 20 described above. In this case, the other-party apparatus 10 need not transmit the voice input to the microphone 170 to the target electronic apparatus 10, as in the case of the modified phone communication described above. Further, the message transmitted by the other-party apparatus 10 may be input to the target electronic apparatus 10 without being relayed by the server apparatus 50. The target electronic apparatus 10 displays the display screen 750 including the received message display screen for showing messages from the other-party apparatus 10, similarly to the display screen 600 illustrated in FIG. 11 described above.

Further, the apparatus information of the electronic apparatus 10 may include information indicating that the user of the electronic apparatus 10 is in a situation where the user has difficulty in catching voice. Also in this case, in Step s51 described above, the target electronic apparatus 10 can determine whether or not the other-party user is in a situation where the other-party user has difficulty in catching voice, based on the apparatus information of the other-party apparatus 10. For example, the user can notify the electronic apparatus 10 that the user is in a situation where the user has difficulty in catching voice by operating the display surface 12 of the electronic apparatus 10.

Note that execution determination processing defining operation of the target electronic apparatus 10 when the target electronic apparatus 10 determines execution of the voice/message converted communication based on the apparatus information of the other-party apparatus 10 while the target electronic apparatus 10 performs the phone communication with the other-party apparatus 10 is not limited to the processing (i.e., the third concurrent phone communication processing) illustrated in FIG. 23 described above. Another example of the execution determination processing will be described below.

The third concurrent phone communication processing illustrated in FIG. 23 may be hereinafter referred to as a "first example of the execution determination processing". Further, in the electronic apparatus 10 performing the phone communication, a speaker that outputs voice transmitted from the other-party apparatus 10 may be hereinafter referred to as a "speaker-in-use". For example, when the electronic apparatus 10 performing the phone communication outputs voice transmitted from the other-party apparatus 10 through the receiver 150, the receiver 150 is the speaker-in-use.

<Second Example of Execution Determination Processing>

Figure 25:
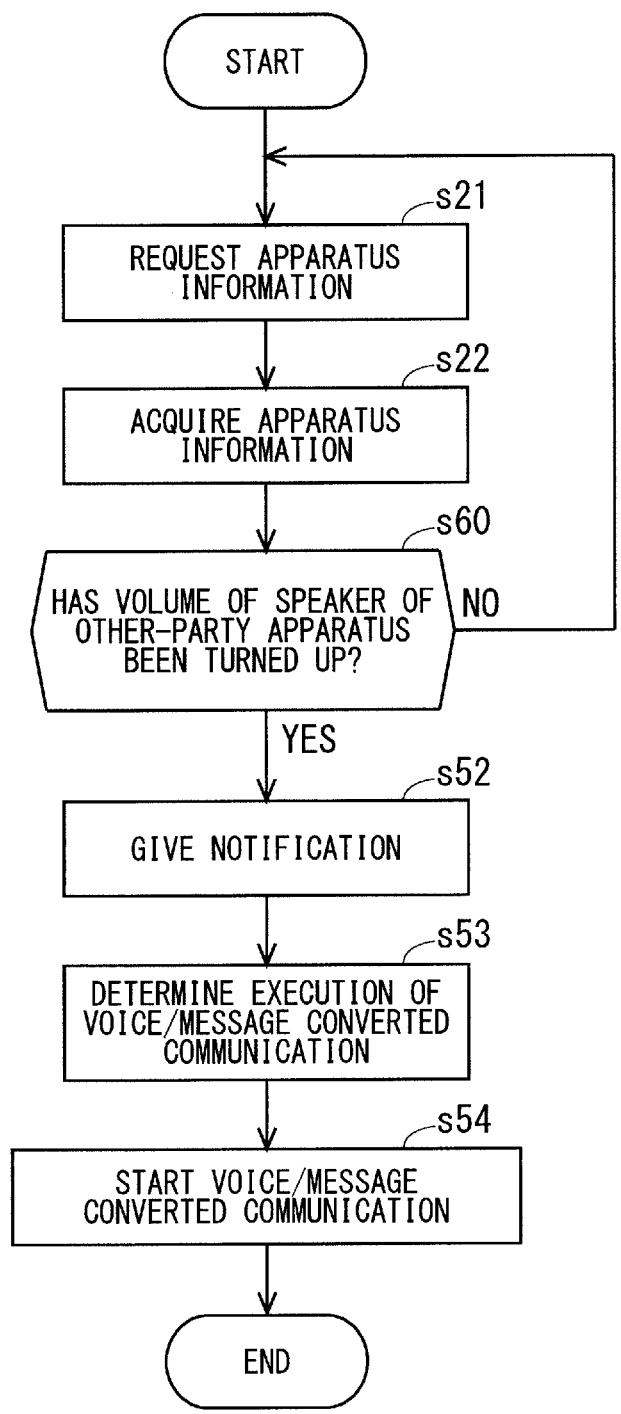
FIG. 25 is a flowchart illustrating one example of operation of the electronic apparatus.

FIG. 25 is a flowchart illustrating execution determination processing according to one example. In one example, when the volume of the speaker-in-use is turned up, the electronic apparatus 10 performing the phone communication generates apparatus information including volume-up information, which indicates that the volume of the speaker-in-use has been turned up. When the subject apparatus user performs operation of commanding turning up of the volume of the speaker-in-use on the subject apparatus such as by operating the volume button included in the operation button group 210, the controller 100 of the electronic apparatus 10 generates the apparatus information including the volume-up information.

As illustrated in FIG. 25, in the execution determination processing according to one example, Steps s21 and s22 described above are executed. Subsequently, in Step s60, the controller 100 of the target electronic apparatus 10 performing the phone communication with the other-party apparatus 10 determines whether or not the volume of the speaker-in-use of the other-party apparatus 10 has been turned up, based on the apparatus information acquired in Step s22. If the apparatus information includes the volume-up information, the controller 100 determines that the volume of the speaker-in-use of the other-party apparatus 10 has been turned up. In contrast, if the apparatus information does not include the volume-up information, the controller 100 determines that the volume of the speaker-in-use of the other-party apparatus 10 has not been turned up.

Note that it can be said that such a situation that the volume of the speaker-in-use of the other-party apparatus 10 has been turned up indicates that the other-party user is in a situation where the other-party user has difficulty in catching voice. Thus, the processing of Step s60 may be regarded as processing of determining whether or not the other-party user is in a situation where the other-party user has difficulty in catching voice, as with Step s51 included in the first example of the execution determination processing.

In Step s60, if it is determined that the volume of the speaker-in-use of the other-party apparatus 10 has been turned up, Steps s52 to s54 described above are executed, and the voice/message converted communication is started between the target electronic apparatus 10 and the other-party apparatus 10. In this manner, the execution determination processing ends. In contrast, in Step s60, if it is determined that the volume of the speaker-in-use of the other-party apparatus 10 has not been turned up, Step s21 is executed again. After Step s21, the target electronic apparatus 10 operates in a manner similar to the above. When the phone communication with the other-party apparatus 10 ends while the target electronic apparatus 10 executes the execution determination processing, the target electronic apparatus 10 ends the execution determination processing.

As described above, in one example, when the controller 100 of the target electronic apparatus 10 determines that the volume of the speaker-in-use of the other-party apparatus 10 has been turned up based on the apparatus information of the other-party apparatus 10, the controller 100 determines execution of the voice/message converted communication. With this configuration, the user of the other-party apparatus 10 communicating with the target electronic apparatus 10 can check the details of the voice transmitted from the target electronic apparatus 10 even if the user is in a situation where the user has difficulty in catching the voice output through the speaker-in-use.

<Third Example of Execution Determination Processing>

Figure 26:
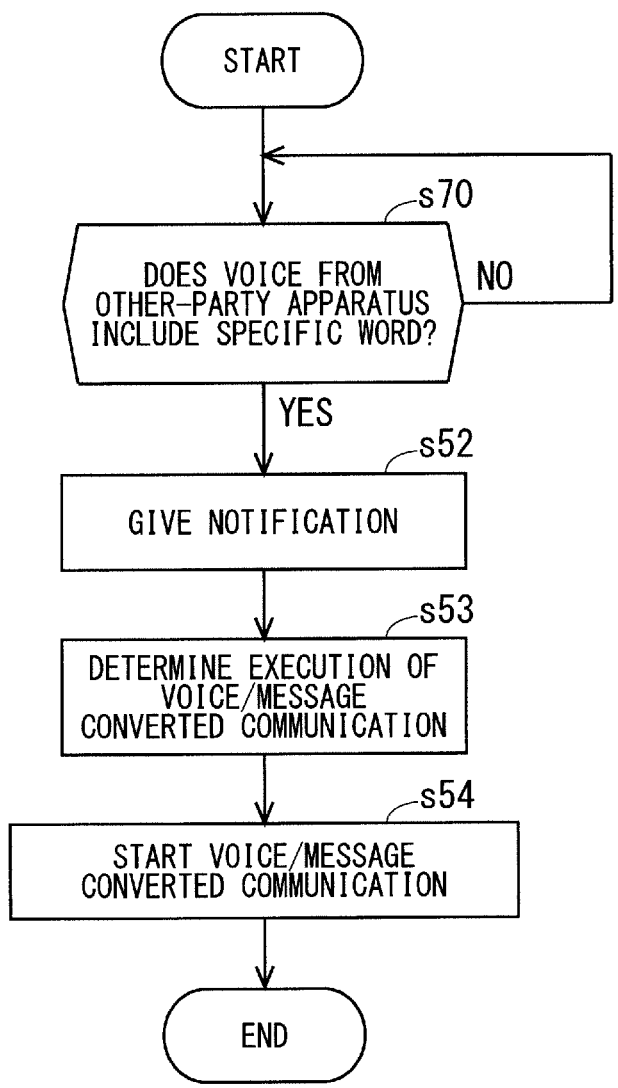
FIG. 26 is a flowchart illustrating one example of operation of the electronic apparatus.

FIG. 26 is a flowchart illustrating execution determination processing according to one example. In one example, the target electronic apparatus 10 determines execution of the voice/message converted communication, based on voice transmitted by the other-party apparatus 10. Specifically, the target electronic apparatus 10 determines execution of the voice/message converted communication when the voice transmitted by the other-party apparatus 10, i.e., voice collected by the microphone 170 of the other-party apparatus 10, includes a specific word. It can be said that the voice transmitted by the other-party apparatus 10, i.e., voice collected by the microphone 170 of the other-party apparatus 10, is a type of apparatus information of the other-party apparatus 10.

As illustrated in FIG. 26, in the execution determination processing according to one example, Step s70 is executed without execution of Steps s21 and s22, unlike the first example illustrated in FIG. 23. In Step s70, the controller 100 of the target electronic apparatus 10 determines whether or not the voice transmitted from the other-party apparatus 10 includes a specific word. Specifically, the controller 100 determines whether or not the voice represented by a voice signal that is transmitted from the other-party apparatus 10 and is received by the wireless communication unit 110 includes a specific word. The specific word is, for example, a word that suggests that the other-party user has difficulty in catching voice output by the other-party apparatus 10. It is assumed that such specific words include, for example, words that suggest that the other-party user failed to catch the voice output from the other-party apparatus 10. Examples of such words include a word "What?" and a word "again".

In Step s70, if the voice represented by the voice signal from the other-party apparatus 10 includes a word "What?", for example, the controller 100 causes the process to proceed to YES. Further, in Step s70, if the voice represented by the voice signal from the other-party apparatus 10 includes a word "again", for example, the controller 100 causes the process to proceed to YES. If the process proceeds to YES in Step s70, Steps s52 to s54 are executed, and the voice/message converted communication is started between the target electronic apparatus 10 and the other-party apparatus 10. In this manner, the execution determination processing ends. If the process proceeds to NO in Step s70, Step s70 is executed again. After Step s70, the target electronic apparatus 10 operates in a manner similar to the above. When the phone communication with the other-party apparatus 10 ends while the target electronic apparatus 10 executes the execution determination processing, the target electronic apparatus 10 ends the execution determination processing.

Note that, in Step s70 according to one example described above, the process proceeds to YES if the voice from the other-party apparatus 10 includes a word that suggests that the other-party user failed to catch voice output from the other-party apparatus 10. Thus, the processing of Step s70 may be regarded as processing of determining whether or not the other-party user is in a situation where the other-party user has difficulty in catching voice, as with Step s60 described above.

As described above, in one example, when the voice from the other-party apparatus 10 includes a specific word, the controller 100 of the target electronic apparatus 10 determines execution of the voice/message converted communication. With this configuration, through appropriate setting of specific words, the target electronic apparatus 10 can determine execution of the voice/message converted communication when the other-party user has difficulty in catching voice output through the speaker-in-use. Consequently, the other-party user can check the details of the voice from the target electronic apparatus 10 even if the other-party user has difficulty in catching the voice output through the speaker-in-use.

<Fourth Example of Execution Determination Processing>

Figure 27:
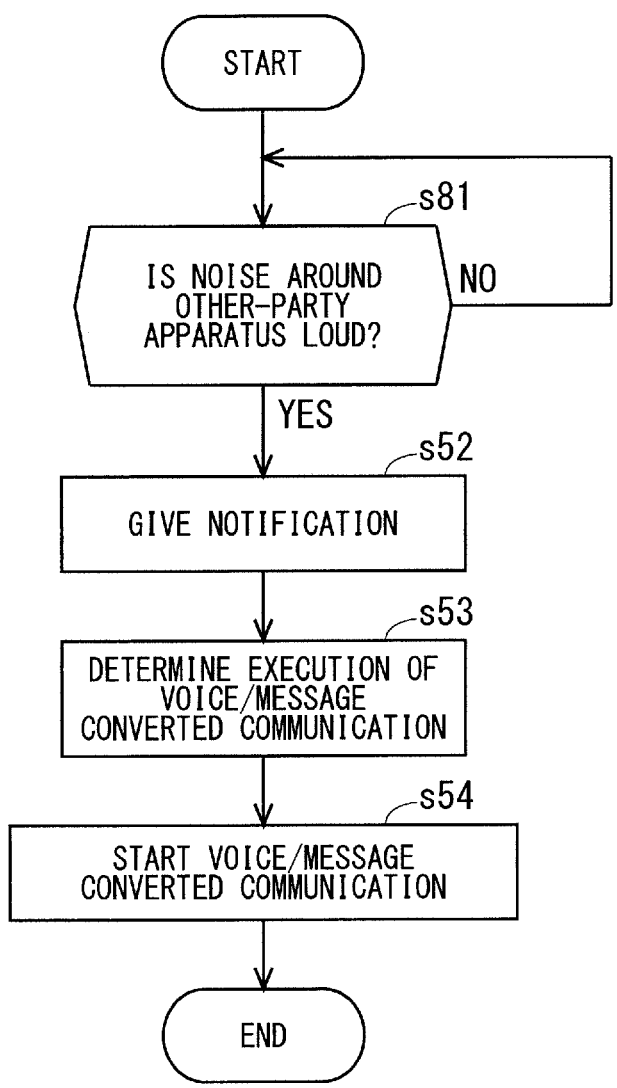
FIG. 27 is a flowchart illustrating one example of operation of the electronic apparatus.

FIG. 27 is a flowchart illustrating execution determination processing according to one example. In one example, similarly to the third example of the execution determination processing described above, the target electronic apparatus 10 determines execution of the voice/message converted communication, based on voice transmitted by the other-party apparatus 10. Specifically, when the target electronic apparatus 10 determines that noise around the other-party apparatus 10 is loud based on the voice transmitted by the other-party apparatus 10, the target electronic apparatus 10 determines execution of the voice/message converted communication.

As illustrated in FIG. 27, in the execution determination processing according to one example, Step s81 is executed without execution of Steps s21 and s22. In Step s81, the controller 100 of the target electronic apparatus 10 determines whether or not noise around the other-party apparatus 10 is loud, based on the voice transmitted from the other-party apparatus 10. Specifically, the controller 100 determines whether or not noise around the other-party apparatus 10 is loud, based on the voice represented by a voice signal that is transmitted from the other-party apparatus 10 and is received by the wireless communication unit 110. The controller 100 extracts a noise component included in the voice signal by executing filtering processing or the like on the voice signal from the other-party apparatus 10. If a level of the extracted noise component is equal to or more than a threshold, the controller 100 determines that the noise around the other-party apparatus 10 is loud. In contrast, if the level of the extracted noise component is less than the threshold, the controller 100 determines that the noise around the other-party apparatus 10 is not loud.

In Step s81, when the controller 100 determines that the noise around the other-party apparatus 10 is loud, Steps s52 to s54 are executed, and the voice/message converted communication is started between the target electronic apparatus 10 and the other-party apparatus 10. In this manner, the execution determination processing ends. In contrast, in Step s81, if the controller 100 determines that the noise around the other-party apparatus 10 is not loud, Step s81 is executed again. After Step s81, the target electronic apparatus 10 operates in a manner similar to the above. When the phone communication with the other-party apparatus 10 ends while the target electronic apparatus 10 executes the execution determination processing, the target electronic apparatus 10 ends the execution determination processing.

Note that if the noise around the other-party apparatus 10 is loud, it is likely that the other-party user is in a situation where the other-party user has difficulty in catching voice. Thus, the processing of Step s81 may be regarded as processing of determining whether or not the other-party user is in a situation where the other-party user has difficulty in catching voice, as with Steps s60 and s70 described above.

As described above, in one example, when the controller 100 of the target electronic apparatus 10 determines that the noise around the other-party apparatus 10 is loud based on the voice from the other-party apparatus 10, the controller 100 determines execution of the voice/message converted communication. With this configuration, the other-party user can check the details of the voice from the target electronic apparatus 10 even if the other-party user has difficulty in catching the voice output through the speaker-in-use.

<Fifth Example of Execution Determination Processing>

Figure 28:
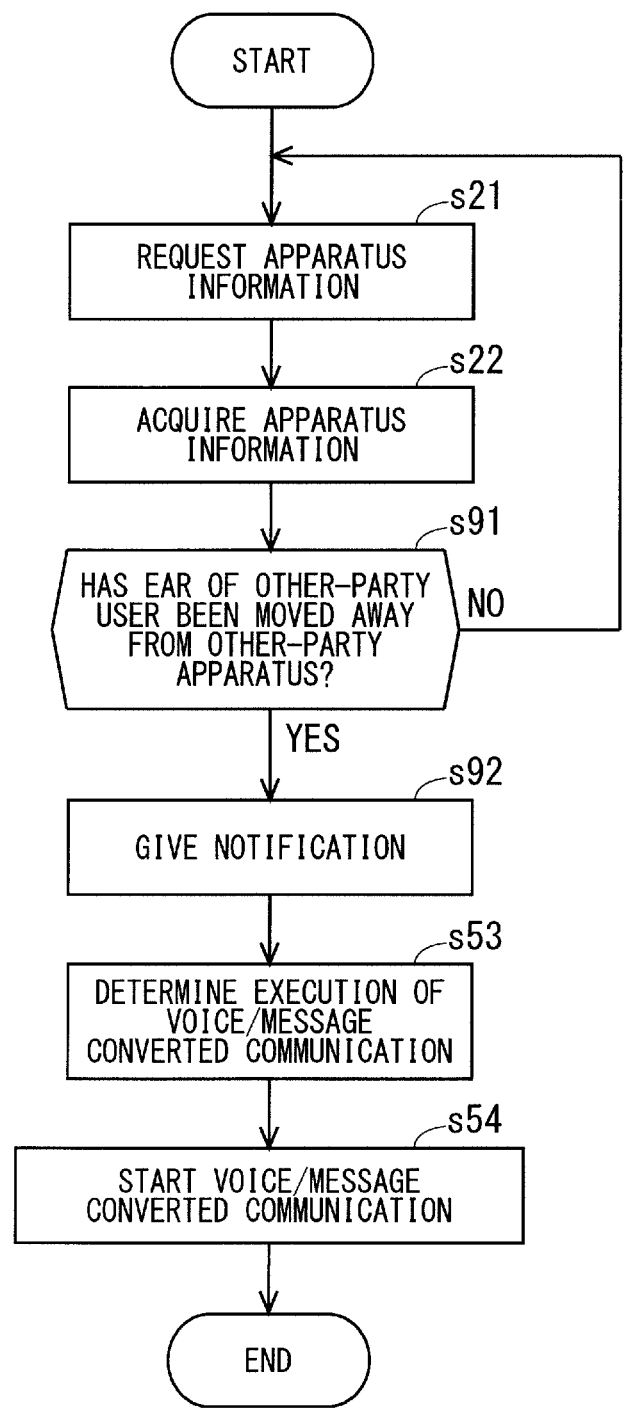
FIG. 28 is a flowchart illustrating one example of operation of the electronic apparatus.

FIG. 28 is a flowchart illustrating execution determination processing according to one example. In one example, when the target electronic apparatus 10 determines that the other-party user has moved their ear away from the other-party apparatus 10 based on the apparatus information of the other-party apparatus 10, the target electronic apparatus 10 determines execution of the voice/message converted communication.

Figure 29:
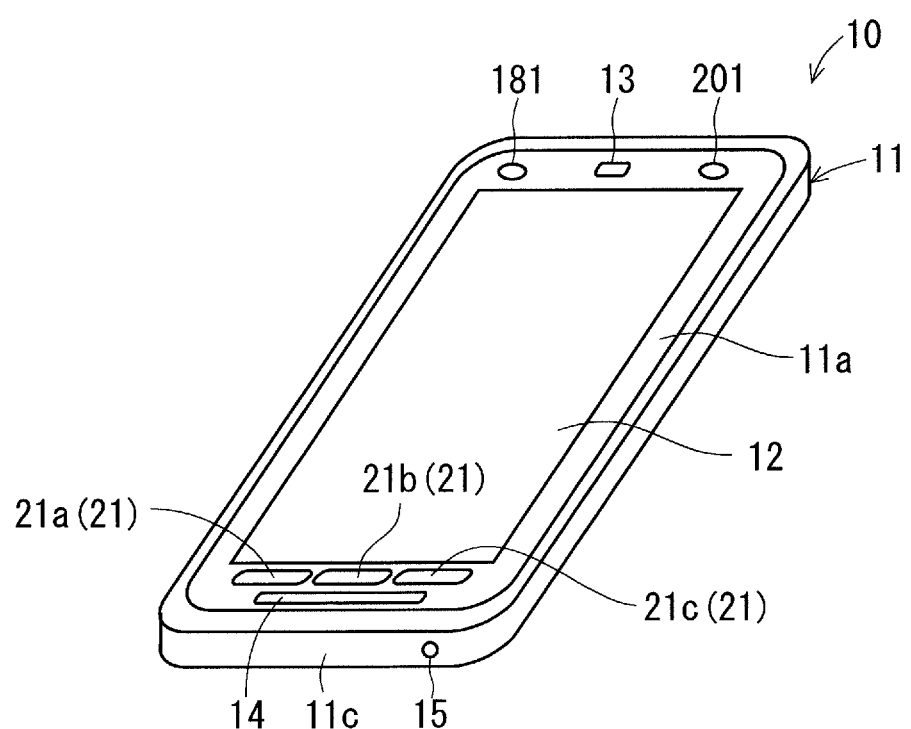
FIG. 29 is a perspective view illustrating one example of external appearance of the electronic apparatus.

In one example, the sensor apparatus 200 of the electronic apparatus 10 comprises a proximity sensor 201. As illustrated in FIG. 29, for example, the proximity sensor 201 is located at an upper end portion of the front surface 11a of the apparatus case 11 of the electronic apparatus 10. The proximity sensor 201 can detect an object that approaches the proximity sensor 201. In the electronic apparatus 10 performing the phone communication, the controller 100 generates apparatus information including detection results obtained from the proximity sensor 201. The detection results obtained from the proximity sensor 201 may be hereinafter referred to as "proximity detection results".

As illustrated in FIG. 28, in the execution determination processing according to one example, Steps s21 and s22 described above are executed. Subsequently, in Step s91, the controller 100 of the target electronic apparatus 10 determines whether or not the other-party user has moved their ear away from the other-party apparatus 10, based on proximity detection results that are included in the apparatus information acquired in Step s22 (the proximity detection results may be hereinafter referred to as "latest proximity detection results") and proximity detection results that are included in the previously acquired apparatus information (for example, the apparatus information acquired in previous Step s22) (the proximity detection results may be hereinafter referred to as "previous proximity detection results").

In Step s91, if the controller 100 determines that a state of the proximity sensor 201 of the other-party apparatus 10 has shifted from a detection state, in which the proximity sensor 201 is detecting an object, to a non-detection state, in which the proximity sensor 201 is not detecting an object, based on the previous proximity detection results and the latest proximity detection results, the controller 100 determines that the other-party user has moved their ear away from the other-party apparatus 10. In contrast, if the controller 100 cannot determine that a state of the proximity sensor 201 of the other-party apparatus 10 has shifted from the detection state to the non-detection state based on the previous proximity detection results and the latest proximity detection results, the controller 100 determines that the other-party user has not moved their ear away from the other-party apparatus 10.

If the process proceeds to YES in Step s91, in Step s92, the controller 100 causes a notification unit to give a notification indicating that the other-party user has moved their ear away from the other-party apparatus 10. As the notification unit, for example, the display 120 is adopted. In this case, the controller 100 causes the display 120 to display information 780 indicating that the other-party user has moved their ear away from the other-party apparatus 10. FIG. 30 is a diagram illustrating a display example of the information 780. Note that the controller 100 may cause a notification unit other than the display 120 to give a notification indicating that the other-party user has moved their ear away from the other-party apparatus 10.

After the information 780 is displayed for a certain period of time in Step s92, Steps s53 and s54 described above are executed, and the voice/message converted communication is started between the target electronic apparatus 10 and the other-party apparatus 10. In this manner, the execution determination processing ends. In contrast, if the process proceeds to NO in Step s91, Step s21 is executed again. After Step s21, the target electronic apparatus 10 operates in a manner similar to the above. When the phone communication with the other-party apparatus 10 ends while the target electronic apparatus 10 executes the execution determination processing, the target electronic apparatus 10 ends the execution determination processing.

As described above, in one example, when the controller 100 of the target electronic apparatus 10 determines that the other-party user has moved their ear away from the other-party apparatus 10 based on the apparatus information of the other-party apparatus 10, the controller 100 determines execution of the voice/message converted communication. With this configuration, the other-party user can check the details of the voice transmitted by the target electronic apparatus 10 by seeing messages displayed on the display 120 even if the other-party user moves their ear away from the other-party apparatus 10. As a result, convenience of the electronic apparatus 10 is enhanced.

In one example, the target electronic apparatus 10 determines execution of the voice/message converted communication when the target electronic apparatus 10 determines that the other-party user has moved their ear away from the other-party apparatus 10 based on the apparatus information of the other-party apparatus 10. This means that second timing, at which execution of the voice/message converted communication is determined, may be later than first timing, at which the other-party user actually moves their ear away from the other-party apparatus 10. For this reason, voice input to the microphone 170 of the target electronic apparatus 10 between the first timing and the second timing may fail to be converted into a message. At the same time, it is difficult for the other-party user to hear voice output through the receiver 150 when the other-party user moves their ear away from the other-party apparatus 10. For this reason, if the voice input to the microphone 170 of the target electronic apparatus 10 fails to be converted into a message between the first timing and the second timing, the other-party user may not be able to check the details of the voice.

In view of this, in the voice/message converted communication, the voice that is input to the microphone 170 of the target electronic apparatus 10 even before time when the target electronic apparatus 10 determines execution of the voice/message converted communication may be converted into messages. In this case, the controller 100 of the target electronic apparatus 10 performing the phone communication temporarily stores voice signals output from the microphone 170 in the storage 103. Then, when the controller 100 determines execution of the voice/message converted communication, the controller 100 causes the wireless communication unit 110 to transmit, to the server apparatus 50, voice signals representing voice that had been input to the microphone 170 since a time point that is a predetermined period of time before the time when the controller 100 determined the execution of the voice/message converted communication, based on the voice signals in the storage 103. For example, the predetermined period of time is set to several seconds or so. With this configuration, in the voice/message converted communication, the voice that is input to the microphone 170 of the target electronic apparatus 10 from a time point that is several seconds before the time when the target electronic apparatus 10 determined the execution of the voice/message converted communication is converted into messages. Accordingly, the other-party user can check the details of the voice input to the microphone 170 of the target electronic apparatus 10 between the timing at which the other-party user actually moves their ear away from the other-party apparatus 10 and the timing at which the target electronic apparatus 10 determines execution of the voice/message converted communication. As a result, convenience of the electronic apparatus 10 is further enhanced.

Note that a method in which the target electronic apparatus 10 determines whether or not the other-party user has moved their ear away from the other-party apparatus 10 is not limited to one method described above. For example, whether or not the other-party user has moved their ear away from the other-party apparatus 10 may be determined based on detection results obtained from the touch panel 130 of the other-party apparatus 10. In this case, the electronic apparatus 10 performing the phone communication generates apparatus information including the detection results obtained from the touch panel 130. Detection results obtained from the touch panel 130 when the ear of the user touches the front surface 11a of the apparatus case 11 and detection results obtained from the touch panel 130 when the ear of the user does not touch the front surface 11a are different from each other. Thus, in Step s91, the controller 100 of the target electronic apparatus 10 can determine whether or not the other-party user has moved their ear away from the other-party apparatus 10, based on detection results obtained from the touch panel 130 included in the apparatus information acquired in Step s22 and detection results obtained from the touch panel 130 included in the previously acquired apparatus information.

<Sixth Example of Execution Determination Processing>

Figure 31:
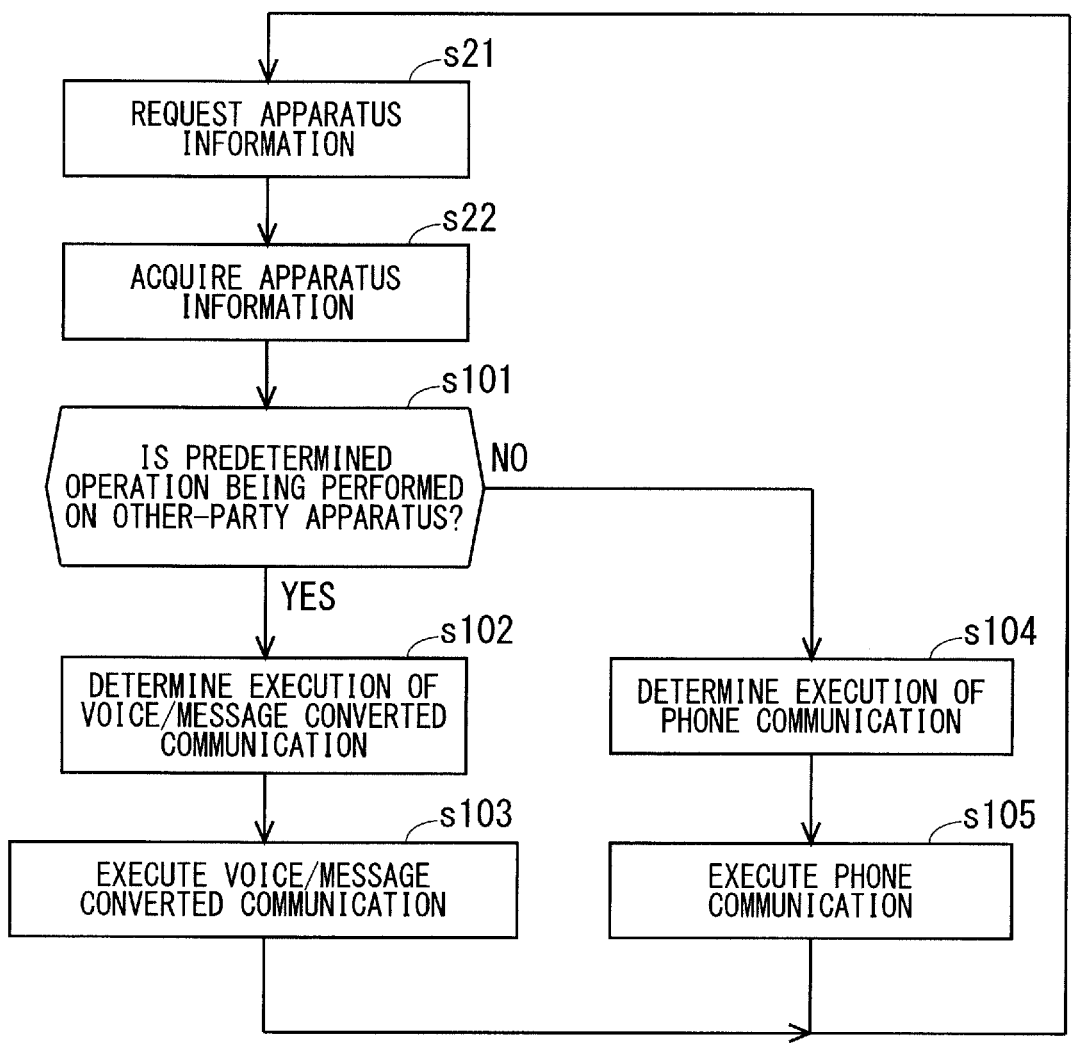
FIG. 31 is a flowchart illustrating one example of operation of the electronic apparatus.

FIG. 31 is a flowchart illustrating execution determination processing according to one example. In one example, when a predetermined operation is performed on the other-party apparatus 10 while the target electronic apparatus 10 performs the phone communication with the other-party apparatus 10, the target electronic apparatus 10 starts the voice/message converted communication with the other-party apparatus 10, and performs the voice/message converted communication with the other-party apparatus 10 while the predetermined operation is performed. Then, when the predetermined operation stops being performed on the other-party apparatus 10, the target electronic apparatus 10 performs the phone communication with the other-party apparatus 10.

The predetermined operation in one example is, for example, an operation of pressing a specific operation button 21 included in the operation button group 210 of the other-party apparatus 10. The specific operation button 21 may be any of the operation buttons 21a to 21c illustrated in FIG. 2, or may be an operation button 21 other than the operation buttons 21a to 21c. Further, the specific operation button 21 may be located on the front surface 11a of the apparatus case 11, may be located on the side surface of the apparatus case 11, or may be located on the back surface 11b of the apparatus case 11. Note that the predetermined operation may be an operation of pressing a software button displayed on the display surface 12. Further, the predetermined operation may be an operation other than the operation of pressing a button of the other-party apparatus 10.

In one example, while the specific operation button 21 is pressed, the electronic apparatus 10 generates apparatus information including button-operated information, which indicates that the specific operation button 21 is being pressed.

As illustrated in FIG. 31, in the execution determination processing according to one example, Steps s21 and s22 described above are executed. Subsequently, in Step s101, the controller 100 of the target electronic apparatus 10 determines whether or not the predetermined operation is being performed on the other-party apparatus 10, based on the apparatus information acquired in Step s22. Specifically, the controller 100 determines whether or not the specific operation button 21 included in the operation button group 210 of the other-party apparatus 10 is being pressed, based on the apparatus information of the other-party apparatus 10. In Step s101, if the apparatus information includes the button-operated information, the controller 100 determines that the specific operation button 21 of the other-party apparatus 10 is being pressed. In contrast, if the apparatus information does not include the button-operated information, the controller 100 determines that the specific operation button 21 of the other-party apparatus 10 is not being pressed.

If the process proceeds to YES in Step s101, in Step s102, the controller 100 determines execution of the voice/message converted communication with the other-party apparatus 10. Subsequently, in Step s103, the target electronic apparatus 10 executes the voice/message converted communication with the other-party apparatus 10. After Step s103, Step s21 is executed again. After Step s21, the target electronic apparatus 10 operates in a manner similar to the above.

In contrast, if the process proceeds to NO in Step s101, in Step s104, the controller 100 determines execution of the phone communication with the other-party apparatus 10. Subsequently, in Step s105, the target electronic apparatus 10 performs the phone communication with the other-party apparatus 10. Subsequently, Step s21 is executed again. After Step s21, the electronic apparatus 10 operates in a manner similar to the above.

If the process proceeds to YES in Step s101 and the target electronic apparatus 10 performs the phone communication with the other-party apparatus 10, in Step s103, the target electronic apparatus 10 performs the voice/message converted communication with the other-party apparatus 10 instead of the phone communication with the other-party apparatus 10. In contrast, if the process proceeds to YES in Step s101 and the target electronic apparatus 10 performs the voice/message converted communication with the other-party apparatus 10, in Step s103, the target electronic apparatus 10 maintains the voice/message converted communication with the other-party apparatus 10.

Further, if the process proceeds to NO in Step s101 and the target electronic apparatus 10 performs the voice/message converted communication with the other-party apparatus 10, in Step s105, the target electronic apparatus 10 performs the phone communication with the other-party apparatus 10 instead of the voice/message converted communication of the other-party apparatus 10. In this case, in Step s105, the target electronic apparatus 10 notifies the other-party apparatus 10 to execute the phone communication. The other-party apparatus 10 that has received the notification executes the phone application instead of execution of the message communication application. In the target electronic apparatus 10, the display screen 770 illustrated in FIG. 24 is displayed instead of the display screen 750 illustrated in FIG. 21. In the other-party apparatus 10, a display screen similar to the display screen 770 illustrated in FIG. 24 is displayed instead of the display screen 760 illustrated in FIG. 22. In contrast, if the process proceeds to NO in Step s101 and the target electronic apparatus 10 performs the phone communication with the other-party apparatus 10, in Step s105, the target electronic apparatus 10 maintains the phone communication with the other-party apparatus 10.

As described above, in one example, when the target electronic apparatus 10 determines that the predetermined operation is being performed on the other-party apparatus 10 based on the apparatus information of the other-party apparatus 10, the target electronic apparatus 10 determines execution of the voice/message converted communication. With this configuration, the user of the other-party apparatus 10 can cause execution of the voice/message converted communication between the other-party apparatus 10 and the target electronic apparatus 10 by performing the predetermined operation on the other-party apparatus 10. Consequently, the user of the other-party apparatus 10 can cause the other-party apparatus 10 to display messages showing the details of the voice transmitted by the target electronic apparatus 10 when necessary. As a result, convenience of the electronic apparatus 10 is enhanced.

Note that, while the target electronic apparatus 10 performs the phone communication with the other-party apparatus 10, the target electronic apparatus 10 may execute at least two examples out of the first to sixth examples of the execution determination processing. For example, it is assumed that the first and second examples of the execution determination processing are executed. In this case, when the target electronic apparatus 10 determines that the other-party user is in a situation where the other-party user has difficulty in catching voice, the target electronic apparatus 10 determines execution of the voice/message converted communication. When the target electronic apparatus 10 determines that the volume of the speaker-in-use of the other-party apparatus 10 has been turned up, the target electronic apparatus 10 determines execution of the voice/message converted communication. In another example, it is assumed that the third to sixth examples of the execution determination processing are executed. In this case, when the voice from the other-party apparatus 10 includes a specific word, the target electronic apparatus 10 determines execution of the voice/message converted communication. When the target electronic apparatus 10 determines that noise around the other-party apparatus 10 is loud, the target electronic apparatus 10 determines execution of the voice/message converted communication. When the target electronic apparatus 10 determines that the other-party user has moved their ear away from the other-party apparatus 10, the target electronic apparatus 10 determines execution of the voice/message converted communication. When the target electronic apparatus 10 determines that the predetermined operation is being performed on the other-party apparatus 10, the target electronic apparatus 10 determines execution of the voice/message converted communication.

In each example described above, the voice/message converted communication performed between the target electronic apparatus 10 and the other-party apparatus 10 is performed via the server apparatus 50, but may be performed without using the server apparatus 50. In this case, the controller 100 of the target electronic apparatus 10 may convert voice input to the microphone 170 into a message, and the target electronic apparatus 10 may transmit the message to the other-party apparatus 10. Alternatively, the controller 100 of the other-party apparatus 10 may convert voice (i.e., a voice signal) transmitted from the target electronic apparatus 10 into a message, and the other-party apparatus 10 may display the message. Further, the controller 100 of the other-party apparatus 10 may convert a message addressed to the target electronic apparatus 10 into voice, and the other-party apparatus 10 may transmit a voice signal representing the voice to the target electronic apparatus 10. Alternatively, the controller 100 of the target electronic apparatus 10 may convert a message from the other-party apparatus 10 into voice, and the target electronic apparatus 10 may output the voice through the receiver 150 or the like.

While the processing system 1 has been shown and described in detail, the foregoing description is in all aspects illustrative, and the present disclosure is not limited to the foregoing description. Further, various modifications described above are applicable in combination as long as such combination remains consistent. It is therefore understood that numerous unillustrated modifications and variations can be devised without departing from the scope of the present disclosure.

The invention claimed is:

1. An electronic apparatus comprising:
a communication unit configured to acquire information related to an other-party apparatus; and
at least one processor configured to receive input of a voice signal output from a first voice input unit, wherein
the electronic apparatus and the other-party apparatus are capable of communicating with each other with voice/message converted communication in which first voice input to the first voice input unit is converted into a first message and the first message is displayed on the other-party apparatus,
the at least one processor determines execution of the voice/message converted communication, based on the information,
the at least one processor causes a first sound output unit to output voice,
the other-party apparatus performs processing using a voice signal output from a second voice input unit,
the other-party apparatus causes a second sound output unit to output voice,
the electronic apparatus and the other-party apparatus are capable of communicating with each other with phone communication in which second voice input to the first voice input unit is received in the other-party apparatus, the second voice is output from the second sound output unit, third voice input to the second voice input unit is received in the communication unit, and the third voice is output from the first sound output unit,
the at least one processor determines the execution of the voice/message converted communication based on the information while the phone communication is performed between the electronic apparatus and the other-party apparatus, and
the at least one processor determines the execution of the voice/message converted communication when the at least one processor determines that volume of the second sound output unit of the other-party apparatus has been turned up based on the information while the phone communication is performed between the electronic apparatus and the other-party apparatus.

2. The electronic apparatus according to claim 1, wherein the information comprises the third voice, and
the at least one processor determines the execution of the voice/message converted communication based on the third voice while the phone communication is performed between the electronic apparatus and the other-party apparatus.

3. The electronic apparatus according to claim 2, wherein the at least one processor determines the execution of the voice/message converted communication when the third voice comprises a specific word while the phone communication is performed the between the electronic apparatus and the other-party apparatus.

4. The electronic apparatus according to claim 2, wherein the at least one processor determines the execution of the voice/message converted communication when the at least one processor determines that noise around the other-party apparatus is loud based on the third voice while the phone communication is performed between the electronic apparatus and the other-party apparatus.

5. The electronic apparatus according to claim 1, wherein the at least one processor determines the execution of the voice/message converted communication when the at least one processor determines that a user of the other-party apparatus has moved their ear away from the other-party apparatus based on the information while the phone communication is performed between the electronic apparatus and the other-party apparatus.

6. The electronic apparatus according to claim 5, wherein in the voice/message converted communication, the at least one processor converts the first voice into the first message, the first voice being input to the first sound input unit even before time when the at least one processor determines the execution of the voice/message converted communication.

7. The electronic apparatus according to claim 1, wherein the at least one processor determines the execution of the voice/message converted communication when the at least one processor determines that a predetermined operation is being performed on the other-party apparatus based on the information while the phone communication is performed between the electronic apparatus and the other-party apparatus.

8. The electronic apparatus according to claim 1, wherein in the voice/message converted communication, a second message generated by the other-party apparatus is converted into fourth voice, and the fourth voice is output from the first sound output unit.

9. The electronic apparatus according to claim 8, wherein the fourth voice is generated based on fifth voice registered in an address book stored in the other-party apparatus.

10. The electronic apparatus according to claim 1, wherein
- in the voice/message converted communication, a second message generated by the other-party apparatus is converted into fourth voice, and the fourth voice is output from the first sound output unit, and
- the fourth voice is generated based on the third voice input to the second sound input unit in the phone communication.

11. The electronic apparatus according to claim 1, wherein
- the electronic apparatus comprises the first voice input unit.

12. An electronic apparatus is the other-party apparatus with which the electronic apparatus according to claim 1 is capable of communicating.

13. A processing system comprising:
- the electronic apparatus according to claim 1; and
- the other-party apparatus with which the electronic apparatus is capable of communicating.

* * * * *